United States Patent [19]
Gerri et al.

[11] Patent Number: 4,642,634
[45] Date of Patent: Feb. 10, 1987

[54] OPTICAL ENCODER

[75] Inventors: Edward J. Gerri, Riverdale, N.J.; David P. Eisenhauer, Greer, S.C.

[73] Assignee: NCR Corporation, Dayton, Ohio

[21] Appl. No.: 651,721

[22] Filed: Sep. 18, 1984

[51] Int. Cl.4 .............................................. G08C 19/16
[52] U.S. Cl. ........................... 340/870.02; 340/310 A; 340/347 M
[58] Field of Search ...................... 340/870.02, 870.03, 340/870.21, 310 A, 347 M

[56] References Cited
U.S. PATENT DOCUMENTS 4,298,839 11/1981 Johnston ..................... 340/870.02 X
4,500,779 2/1985 Killingsworth ............ 340/870.02 X Primary Examiner—Jerry W. Myracle
Attorney, Agent, or Firm—Wilbert Hawk, Jr.; Albert L. Sessler, Jr.; George J. Muckenthaler

[57] ABSTRACT

An optical encoder is retrofitted on an existing electric kilowatt utility meter for providing a host of data collection and processing functions performed at the meter site. The encoder permits local observation of the meter dials, and enables remote reading of the dials by use of microprocessor control circuitry as well as providing remote programming of encoder inputs and outputs, demand metering, and period metering. The outputs of successive decades of a polydecade meter are read into the microprocessor and the output data is transmitted via a serial communications link to the remote facility.

21 Claims, 40 Drawing Figures

| FIG. 5A | FIG. 5B |
|---------|---------|
| FIG. 5C | FIG. 5D |

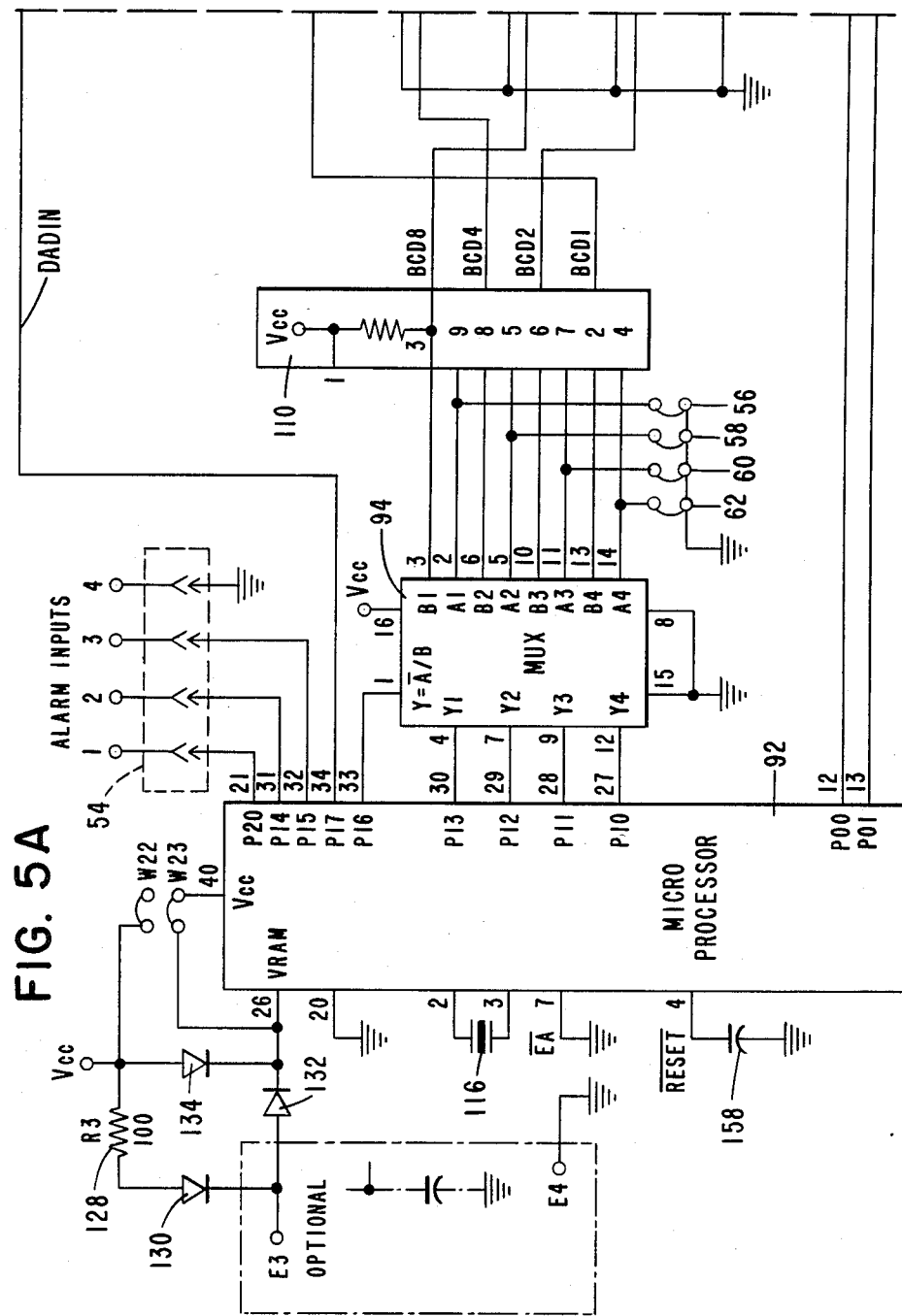

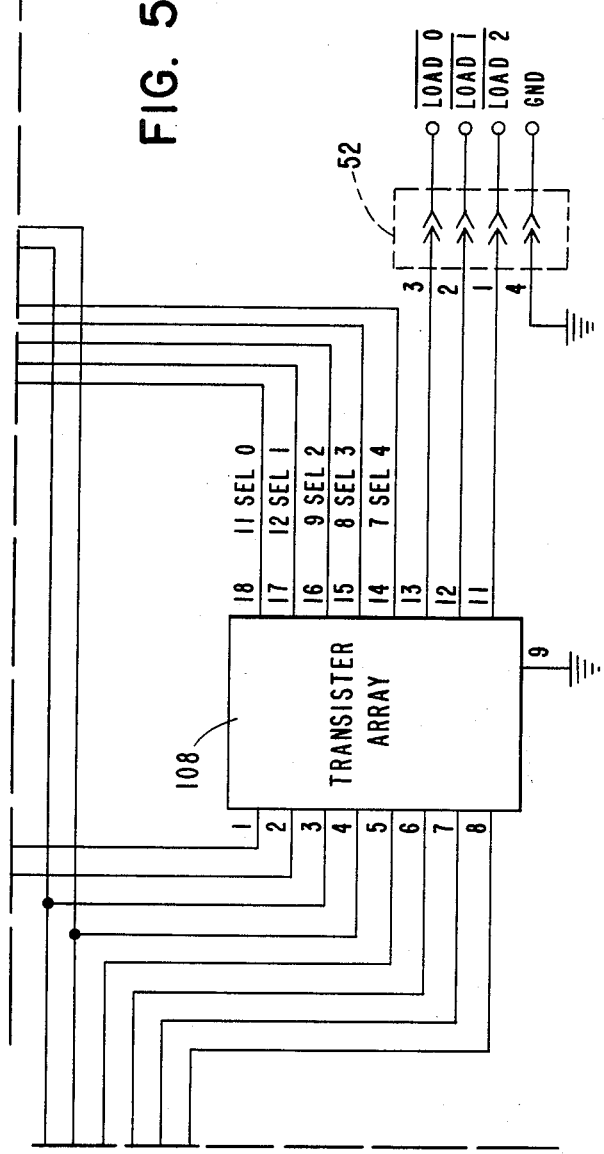

MAIN PROCESSING LOOP

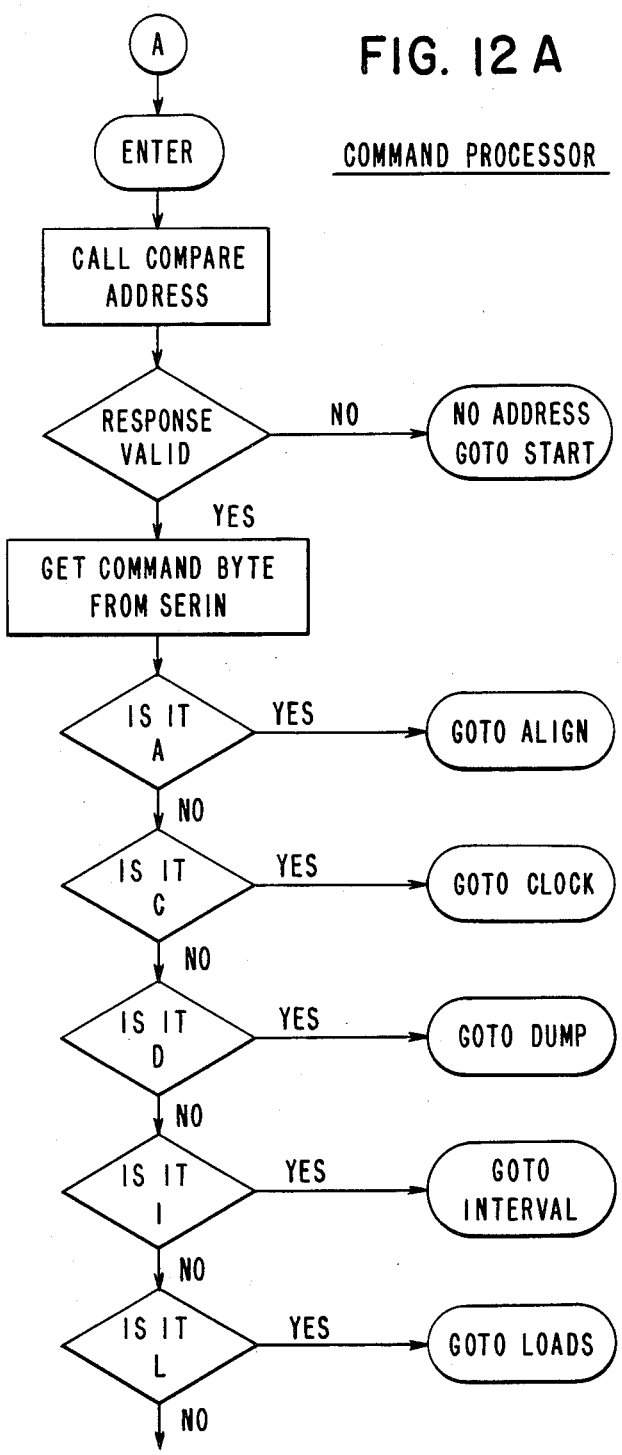

TIMER INTERRUPT

CHECK PERIOD

PERIOD START

PERIOD END

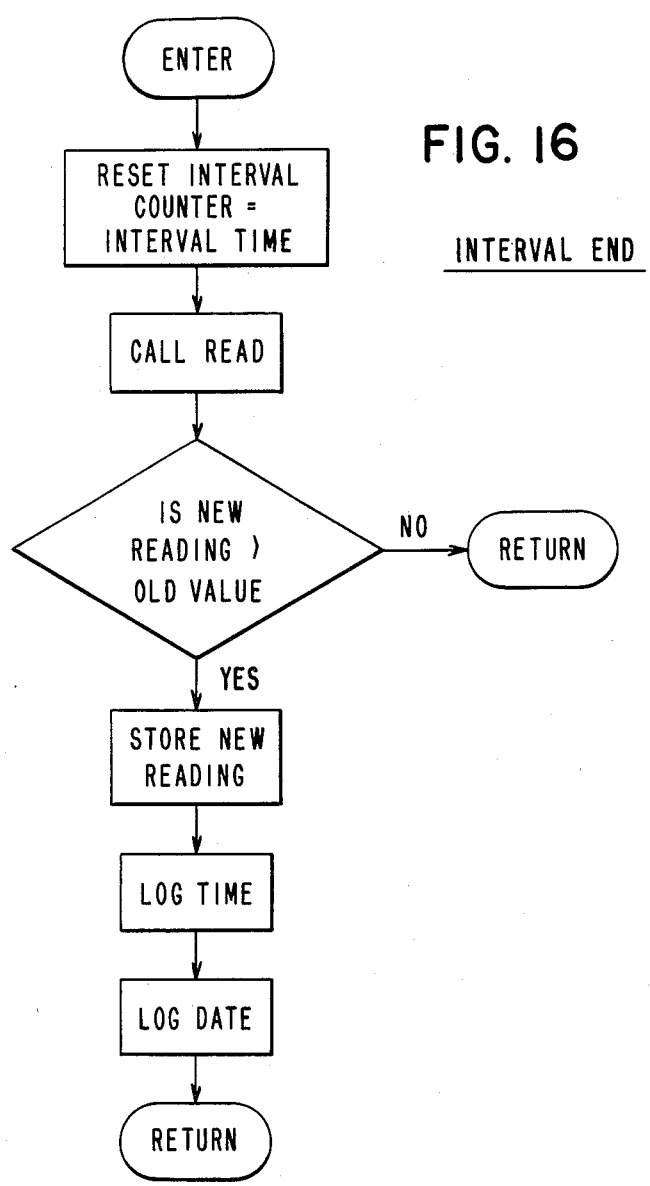

ALIGN

CLOCK

SEND ADDRESS

SEND DATA

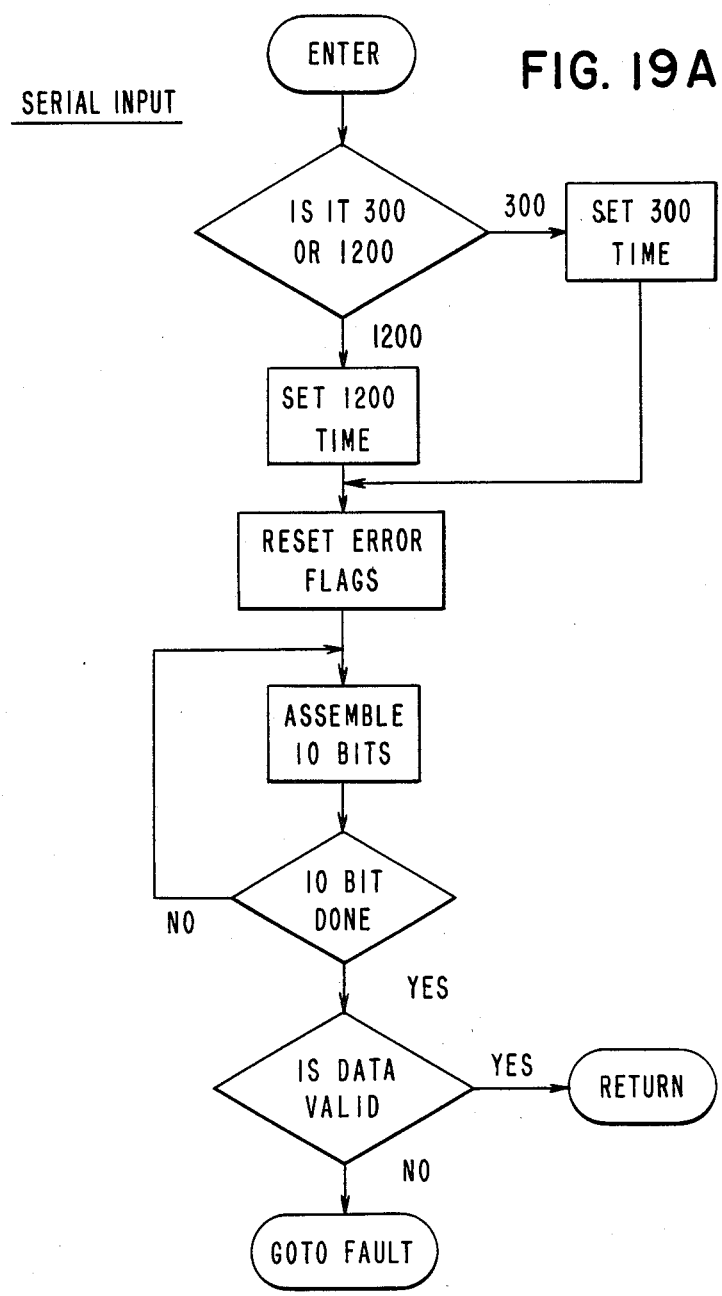

SERIAL OUTPUT

OPTICAL ENCODER

BACKGROUND OF THE INVENTION

In the field of electrical utility service, it is known that consumption of electrical power occurs at different times of the day in varying amounts and that most electrical usage is during the late afternoon and evening hours. Consumption of electricity is commonly measured by means of a meter installed at the consumer's premises, and the electrical or utility companies employ personnel to make periodic readings of the meters for purposes of billing the individual customers or for otherwise monitoring consumption of the supplied commodity.

Within recent years, this approach and arrangement has been somewhat modernized by use of meter apparatus and/or systems which are capable of providing digital or other like encoded outputs of the readings at a meter installation and at selected times of the day. The data provided by the meters may be transmitted to a central location such as offices of the utility furnishing the commodity and thereby eliminating the need for direct observation of the meter by utility personnel on the customer's premises.

The form of transmission of the data or information may be accomplished in several ways including existing power network lines, telephone communication lines, or like systems for carrying the information from the meter to a central location. While the several ways and means for gathering the consumption data or information at the meters and the transmitting of such data or information to a central facility have utilized the above methods of collection and transmission, it is seen that improved reading and encoding means permit better ways and means for gathering and for conveying the information.

Representative documentation relating to readings of commodity consumption and relaying of such readings to a central location include U.S. Pat. No. 3,312,964, issued to N. L. Kahn et al. on Apr. 4, 1967, which discloses a meter encoder-transmitter with an encoder assembly and an arrangement for transmitting information from a metering instrument.

U.S. Pat. No. 3,846,788, issued to S. R. Calabro et al. on Nov. 5, 1974, discloses a polydecade decimal-to-digital encoder utilizing a light source and appropriate masks to provide a plurality of point light sources which register with an array of diodes. A plurality of encoding wheels having slotted segments arranged in concentric tracks are positioned to enable occlusion of incident light on photosensors in accordance with the angular position of the various encoding wheels.

U.S. Pat. No. 3,846,789, issued to W. R. Germer et al. on Nov. 5, 1974, discloses a remote reading register with error detecting capability and which includes an optical encoding mechanism for encoding the angular position of each shaft of the register in a six-bit digital code and is capable of resolving ambiguity in formulating an encoded message and also capable of detecting transmission of erroneous encoded messages.

U.S. Pat. No. 3,898,649, issued to D. C. Beck on Aug. 5, 1975, discloses an encoder device for converting the analog value of a rotatable shaft for use with polydecade consumption or usage meters and to transmit digital information for transmission to a utilization point. Each encoding wheel of the register is divided into sectors and the rotational positions of each wheel are determined by optically reading the tracks of coding.

U.S. Pat. No. 3,900,842, issued to S. R. Calabro et al. on Aug. 19, 1975, discloses a remote automatic meter reading and control system having a plurality of meters and means for translating or encoding the meter readings along with transmitting the data on a carrier to a central control station.

U.S. Pat. No. 4,007,454, issued to C. Cain et al. on Feb. 8, 1977, discloses apparatus for remotely determining the angular orientation speed and/or direction of rotation of a rotating member and wherein a rotating electric field along with a sensing or reading device detects variations in the field and creates an output dependent upon the angular orientation of the rotating member. A transducer unit indicates the hand position of a meter dial at any particular time in a demand metering application.

U.S. Pat. No. 4,037,219, issued to A. M. Lewis on July 19, 1977, discloses a meter dial encoder for remote meter reading which converts angular dial pointer shaft positions by means of a single track code pattern with binary coded arcuate sectors rotated by the shaft. The pattern is rotated adjacent a pattern-sensing assembly including a single circular row of sensing positions with associated sensors for producing a multiple bit binary code signal in suitable form for telemetering the meter reading to a remote location.

U.S. Pat. No. 4,135,181, issued to A. P. Bogacki et al. on Jan. 16, 1979, discloses a remote automatic utility meter reading system comprising a computer for transmitting commands having address portions and a function code portion, addressable control units, and a plurality of transponder units which include a meter having an encoder for generating data signals representative of a commodity reading measured by the meter.

U.S. Pat. No. 4,161,720, issued to A. P. Bogacki on July 17, 1979, discloses a remote automatic utility meter reading system comprising register means, a meter including an encoder capable of generating data signals representative of the meter reading, addressable storage means for storing the reading, and first and second address recognition means responsive to commands received by the register means.

U.S. Pat. No. 4,264,897, issued to R. G. Farnsworth on Apr. 28, 1981, discloses a self-contained remotely readable register encoder capable of providing timing and meter data signals and uses an external power source to energize the encoder and the circuitry. A scanning and timing disk provides timing and data light pulses to photosensors and a circuit board includes timing and data pulse generator circuitry to the output connector.

U.S. Pat. No. 4,315,251, issued to P. B. Robinson et al. on Feb. 9, 1982, discloses a remote automatic utility monitoring and control system including a terminal unit having means for receiving a command which includes an action portion and a function code portion, and decode means responsive to the received command when recognizing first and second addresses.

U.S. Pat. No. 4,342,908, issued to T. Henningsen et al. on Aug. 3, 1982, discloses a light distribution system for optical encoders having an array of photosensitive sensors and including a light guide plate along with light input couplers and output couplers.

U.S. Pat. No. 4,415,853, issued to B. M. Fisher on Nov. 15, 1983, discloses a monitoring device and method for accurately determining and recording present demand of electrical energy consumed over a predetermined time period and which includes an adjustable reflective scanner or sensor mounted exterior of an electric meter for sensing and determining the speed of the rotating disk of the meter.

U.S. Pat. No. 4,433,332, issued to T. D. Wason on Feb. 21, 1984, discloses apparatus for remotely determining the angular position speed and/or direction of rotation of a rotating member by using a series of square wave input signals.

U.S. Pat. No. 4,438,434, issued to T. D. Wason on Mar. 20, 1984, discloses a data bus in parallel or serial form for sequential use with a series of data communication devices.

And, U.S. Pat. No. 4,439,764, issued to T. H. York et al. on Mar. 27, 1984, discloses dual mode meter reading apparatus wherein a remote reading system includes a dial register encoder and a pulse encoder both coupled to the same rotary disk of an induction kilowatthour meter.

SUMMARY OF THE INVENTION

The present invention relates to apparatus for reading electric or other types of utility meters. More particularly, the invention relates to an optical encoding device which is associated with an electric or other meter in a retrofit arrangement wherein the encoding device initiates and provides for automatic remote meter reading by reading directly from the dials of the meter.

The optical encoder of the present invention is a low-cost, microprocessor-based device that attaches directly to existing standard kilowatthour or like meters to perform a wide variety of data collection and processing functions. The encoder features an industry standard serial communications link or interface for compatibility with existing data communications equipment. The encoder provides exact readings on demand directly from the dials of the meter through a two-way communications port. The communications link enables various functions which include time-of-use metering for up to four daily periods of time, demand metering which provides peak kilowatt demand for intervals in a range from one minute up to a maximum interval of fifty-nine minutes, an accurate verification of pulse-initiated data at any time without the necessity for visiting the metering site, and instantaneous, system-wide, meter readings available through the optical encoder's ability to read and store readings internally for transmission to a central facility at a later time.

The optical dial encoder has three outputs, accessed independently, for controlling up to three appliance load control relays in on-and-off manner and also for relaying to a central facility the condition of the loads at any specific time. Three input circuits are provided for attaching alarms to the optical dial encoder in instances where alarm condition sensing is of value.

The optical encoder device is required to operate in a system environment so that each unit must be addressable and within a range of addressing that is dependent upon the system network scheme. The present encoding device has the capability to respond to a 16-bit address field which allows thousands of encoding units to be placed in service on the same serial system.

As briefly alluded to above, communications with the optical dial encoder is accomplished via a serial data link which is easily implemented with external equipment. The serial data channel is driven under software control and the 8-bit word format is used as the basis of serial data transmission. In order to perform the higher level tasks required of the encoder unit, a method of keeping track of time is incorporated into the microprocessor and referred to as its internal time-of-day clock.

The software provided with the optical dial encoder is constructed of a set of user friendly commands which direct the encoder to perform a series of tasks ranging from reading the meter register value in an open loop configuration to performing complex time-of-day calculations in a closed loop network. Each encoder unit responds, regardless of the communications media, to a set of ASCII characters wherein the key character that designates the command is the first character of the actual command word.

In accordance with the above discussion, the principal object of the present invention is to provide means for remotely reading a utility meter.

Another object of the present invention is to provide encoding apparatus for an electric meter in a self-contained arrangement.

An additional object of the present invention is to provide optical encoding apparatus for retrofit installation on an existing utility meter.

A further object of the present invention is to provide an optical encoder that is microprocessor controlled for remote reading of a utility meter.

Additional objects and advantages of the present invention will become apparent and fully understood from a reading of the following specification taken together with the annexed drawing.

BRIEF DESCRIPTION OF THE DRAWING

FIGS. 5A–5D, inclusive, illustrate the schematic circuitry utilized in practicing the present invention;

FIGS. 12A and 12B taken together constitute a flow chart of the operation of the command processor;

FIG. 16 is a flow chart of the interval end steps;

FIGS. 19A and 19B show the operational steps covering serial input and serial output.

DESCRIPTION OF THE PREFERRED EMBODIMENT

Figure 1:
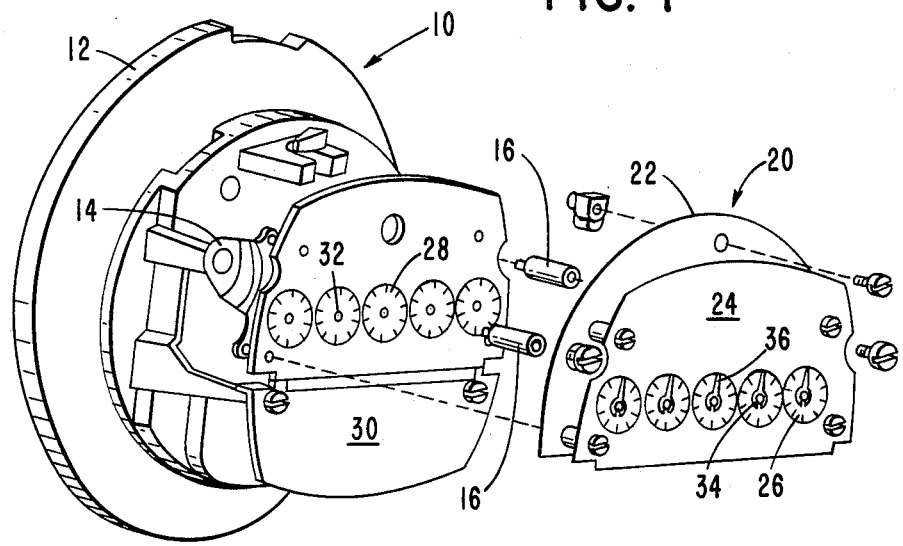
FIG. 1 is a perspective view of an optical encoder and positioned for installation on a standard utility meter.

Referring now to FIG. 1, there is illustrated in perspective view a utility meter, generally designated as 10, of the type such as General Electric Class I70-S or similar, it being seen that such illustration is in a form that does not show the numerous details of the meter. The meter 10 includes a frame 12 for supporting various parts that include at least a pair of bosses 14, only one of which is shown, for receiving studs 16 for securing an optical encoder 20 to the meter. The optical encoder 20 includes a printed circuit board 22 having numerous integrated circuit devices (later described) thereon along with a face plate 24 having a plurality of dials 26 arranged to match axially corresponding dials 28 on a front plate 30 of the meter 10, the latter dials being operably associated with registers in the meter which measure or record the consumption of energy. A plurality of shafts 32 of the meter registers extend in known manner through the front plate 30 and are arranged to connect with corresponding shafts 34 of the optical encoder 20 which carry pointers 36 associated with the dials 26.

Figure 2:
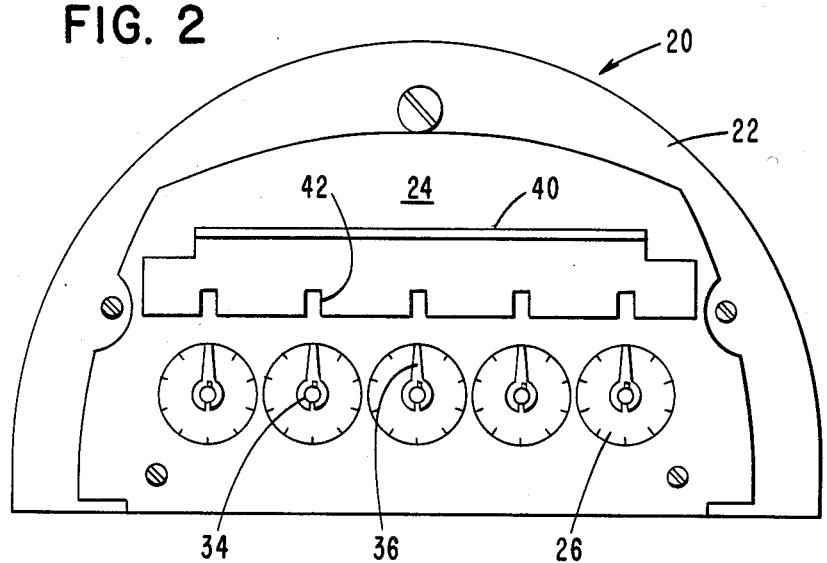
FIG. 2 is a front view of the optical encoding device incorporating structure of the present invention.

FIG. 2 is a front view of the optical encoder 20 showing the printed circuit board 22 and the face plate 24 along with the dials 26 and the pointers 36 on the ends of the shafts 34. It is here noted that prior to installation of the optical encoder 20 on the meter 10, the pointers 36 must all be moved to the zero position, and an alignment tool 40, having slots 42 along one edge thereof, is placed over flat portions of the shafts 34 near the ends thereof to ensure that such shafts are maintained in precise angular position when the shafts 34 are mated with the shafts 32 of the meter registers. The alignment tool 40 may also be used to press the optical encoder shafts 34 onto the shafts 32 of the registers for mounting the encoder 20 to the meter 10.

Figure 3:
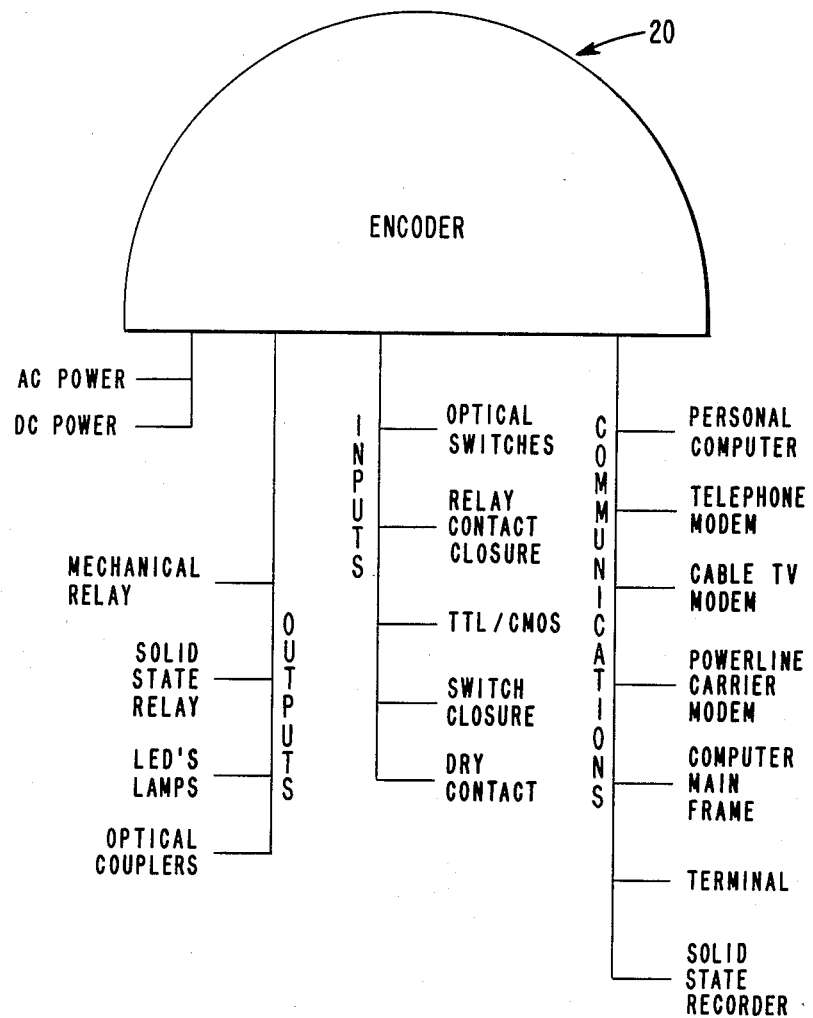
FIG. 3 is a diagrammatic view of the optical encoding device and showing the several encoding applications.

FIG. 3 is a diagrammatic view of the optical encoder 20 showing choices of power input, inputs, outputs, and communication options or applications. A source of power supply may be either in the range of 15–18 volts DC or 16 volts AC at 150 milliamperes applied to the printed circuit board supply to derive appropriate voltages of +12 volts DC, +5 volts DC and −9 volts DC to connect with various devices on the board 22. The optical encoder 20 is capable of accepting an alternate source of power in case of a normal or operating power failure all for the purpose of maintaining data integrity of the components of the optical encoder.

The optical encoder 20 has three unassigned inputs which may be tested by remote calling equipment in the manner wherein the inputs cause no internal action and their logic state is represented as three bits in the internal status register and responsive to proper command. Each input has a pull-up network to +5 volts DC and the normal off or true condition is a logic high. Each input is capable of being driven with a dry contact to ground and the inputs may be driven from either TTL or CMOS data inputs. The three external inputs may be used to detect external status of burgler alarms, fire alarms, security systems or anti-meter tampering devices. The three inputs may also be tied to an extra set of dry contacts derived as a function of the load control outputs to form a closed loop system. A few of the recommended interface techniques are listed as inputs in FIG. 3.

The encoder unit 20 has three undedicated outputs similar to the three inputs just described and in the manner wherein the three outputs are controlled directly by remote calling equipment with the Load command. In order to provide simultaneous switching of all data outputs, the microprocessor (later identified) interprets the input data command and controls the outputs in a bit combinatorial fashion wherein this binary bit pattern is a direct conversion of the input data. The Load command requires one character (a number) following to define the new load configuration. This ASCII character is a number from 0 to 7 and its base binary representation is sent directly to the three outputs which are each controlled by an open-collector NPN type transistor. The condition of the load control outputs appear as three bits in the internal status register and are responsive to proper Query and Load commands. The three bits that designate the loads are normally set at a logic low when the outputs are off. The issuance of the proper Load command followed by a single numeral will set the load outputs and place a representation of their configuration in the status register. A few of the recommended interface techniques are listed as outputs in FIG. 3.

Figure 4:
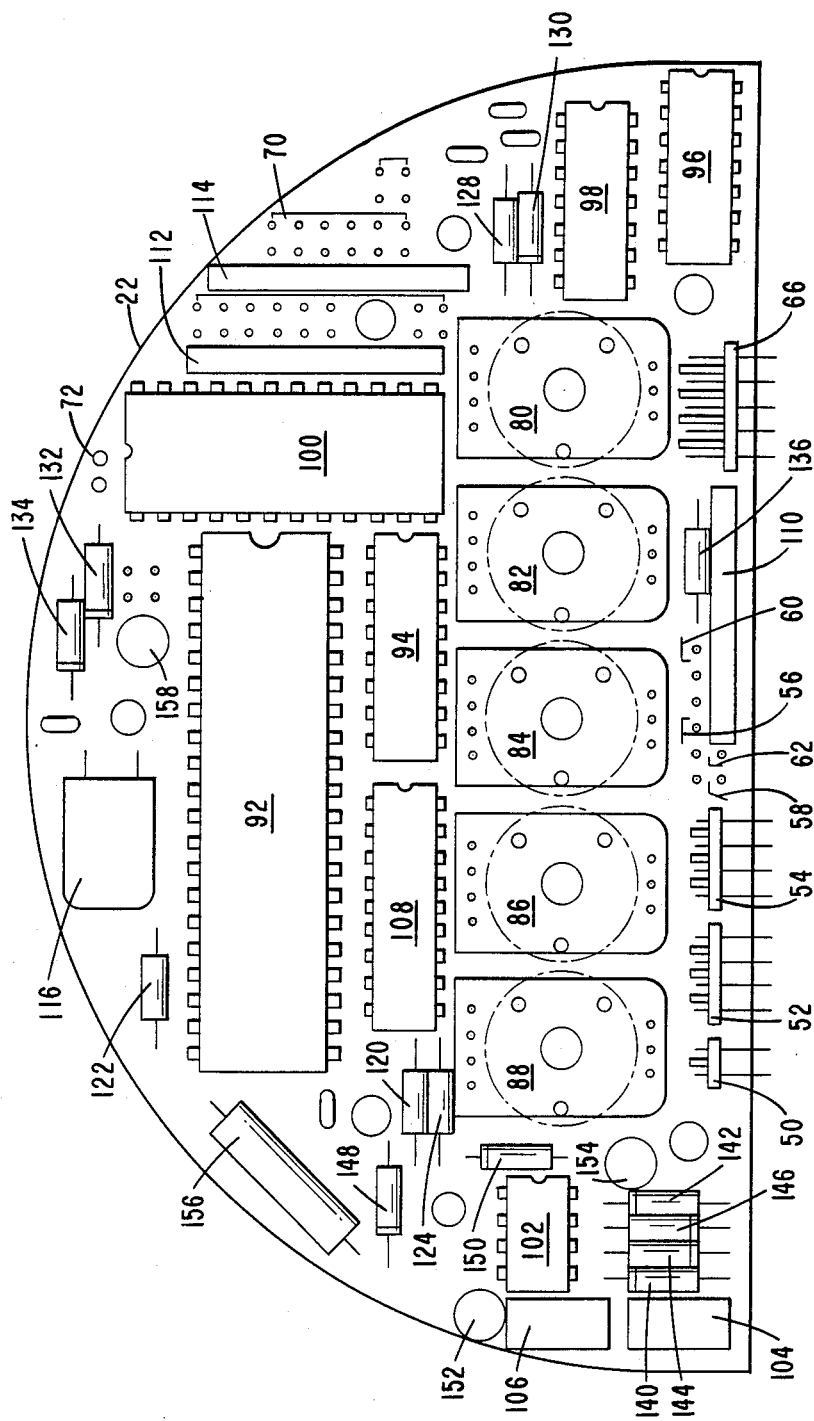
FIG. 4 is a view showing the various integrated circuit devices on the circuit board implementing the encoding system.

FIG. 4 illustrates the preferred layout and arrangement of the various integrated circuit devices on the printed circuit board 22. Input power is applied to the optical encoder 20 at the two pin power connector 50 on the board 22. The load control interface is provided through a four pin load control connector 52 and alarm interfacing is provided by means of a four pin alarm input connector 54.

The optical encoder 20 is provided with four option select jumpers 56, 58, 60 and 62 which determine the mode of operation of the encoder unit. The option select jumper 56 provides modem type communication with the select jumper in place and operating with the serial communication link with designated RS 232 data signals, as RCVD (received data) and XMTD (transmitted data). In the quiescent state, the RTS (request to send) line is off or held at a mark or marking condition, identified as less than −3 volts DC, and the DTR (data terminal ready) line is on or held at a space or spacing condition, identified as greater than +3 volts DC. The DTR signal indicates that the encoder unit is ready to receive data and the modem link may supply data at any time in this mode. After data is supplied and a response is required, the encoder unit first monitors the DSR (data set ready) line from the calling equipment. If this line is in the marking state, the encoder assumes that the calling device or other modem has dropped its communications link and the fault bit in the status register is set and the link is terminated. The encoder unit next raises its RTS line to the space condition which alerts the receiving equipment that a transmission is pending. When the calling equipment has acknowledged the request, it responds with CTS (clear to send) and the encoder unit suspends transmission until the CTS signal is received. If such CTS signal is not received within approximately eight seconds, the fault bit in the status register is set and the communications aborted. Each character to be sent tests the CTS line prior to sending data. The CTS line going to the mark state will suspend transmission and the calling equipment must drop its CTS line a maximum of ten microseconds prior to the next data byte to be transmitted. If the CTS line is dropped after transmission has commenced, the character in the process will be transmitted and may be lost if the data channel has been turned around. The next character in this condition will be suspended. The encoder unit will remain in this condition until the CTS line is returned to the marking condition and a complete message has been transmitted.

The option select jumper 58 deals with the terminating character as sent by the encoder unit 20 wherein the unit sends a carriage return followed by a line feed character (CRLF), and the option select jumper 60 sets the baud rate to either 300 or 1200 bits per second, the latter being the preferred rate. The option select jumper 62 may be used as a spare.

Communications with the optical encoder 20 is accomplished by means of a serial data transmission link (RS 232 environment) readily implemented with external equipment such as a terminal, a computer, telephone modem, cable TV modem or other transmission media, as shown in FIG. 3, and connected through an eight pin connector 66. A serial data channel may typically be driven further than a parallel channel and, in a preferred embodiment, the serial data channel is totally driven under software control wherein the eight bit word format is used as the basis of serial data transmission and wherein the data type is in the form of ACSII, as mentioned above. The design of the optical encoder 20 provides for adaptation to the external equipment mentioned just above and utilizes asynchronous data transmission for simplicity and versatility. While various types of error detection and correction schemes may be implemented in the system, parity of a character appears as the last bit in the serial data stream and is recognized as a standard, and even parity is preferred in the present arrangement. It is thus seen that the optical encoder is communicating in ASCII, usin the eight-bit word in asynchronous data transmission, at a rate of 1200 baud, and using even parity.

The requirement for the encoder unit 20 to operate in a system environment necessitates that each unit be addressable and the range of addressing required is dependent on the system network scheme. The addressing logic of the encoder unit 20 is handled as a combination of hardware and software, and the encoder unit has the ability to respond to a 16-bit address field. The microcomputer scans the address controller via four control lines and assembles the selected address on a bit-by-bit basis. Addressing of the encoder unit is in hexadecimal form. The address select pins are provided as jumpers or switches 70, FIG. 4, on the printed circuit board 22, with each jumper representing a binary bit position or individual address in the addressing word. The presence of a jumper or closed switch 70 in a bit position sets that bit position to a logic zero (0) whereas the bit position changes to a logic one (1) when the jumper is absent or cut. The combination of zeros and ones sets the address within the encoder unit. The encoders specific address is only sampled when power is first applied and this value is then stored within the memory of the microcomputer. The board 22 also has provisions for auxiliary power select at connector 72.

Each unit of the optical encoder family can respond to two discrete addresses, the devices specific address and a global or broadcast address. This concept allows the choice of sending commands to specific units or to all or global units. In the address mode, the encoder expects four consecutive bytes of ASCII data that represent the specific or global address of the unit.

Figure 5:
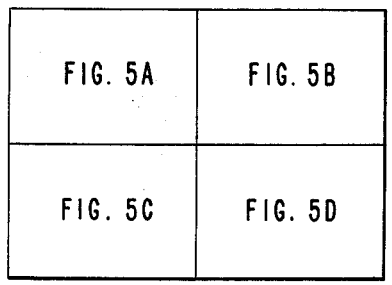
FIG. 5, on the sheet with FIG. 2, is a diagram showing the arrangement of FIGS. 5A, 5B, 5C and 5D.

FIG. 4 also shows the physical locations of the five encoder modules 80, 82, 84, 86 and 88 associated with the register wheels of the meter 10 along with the other integrated circuit devices operably associated for practicing the invention, and FIGS. 5A, 5B, 5C and 5D, arranged as shown in FIG. 5, illustrate the schematic diagram of the connections for the various circuit devices.

Figure 5B:
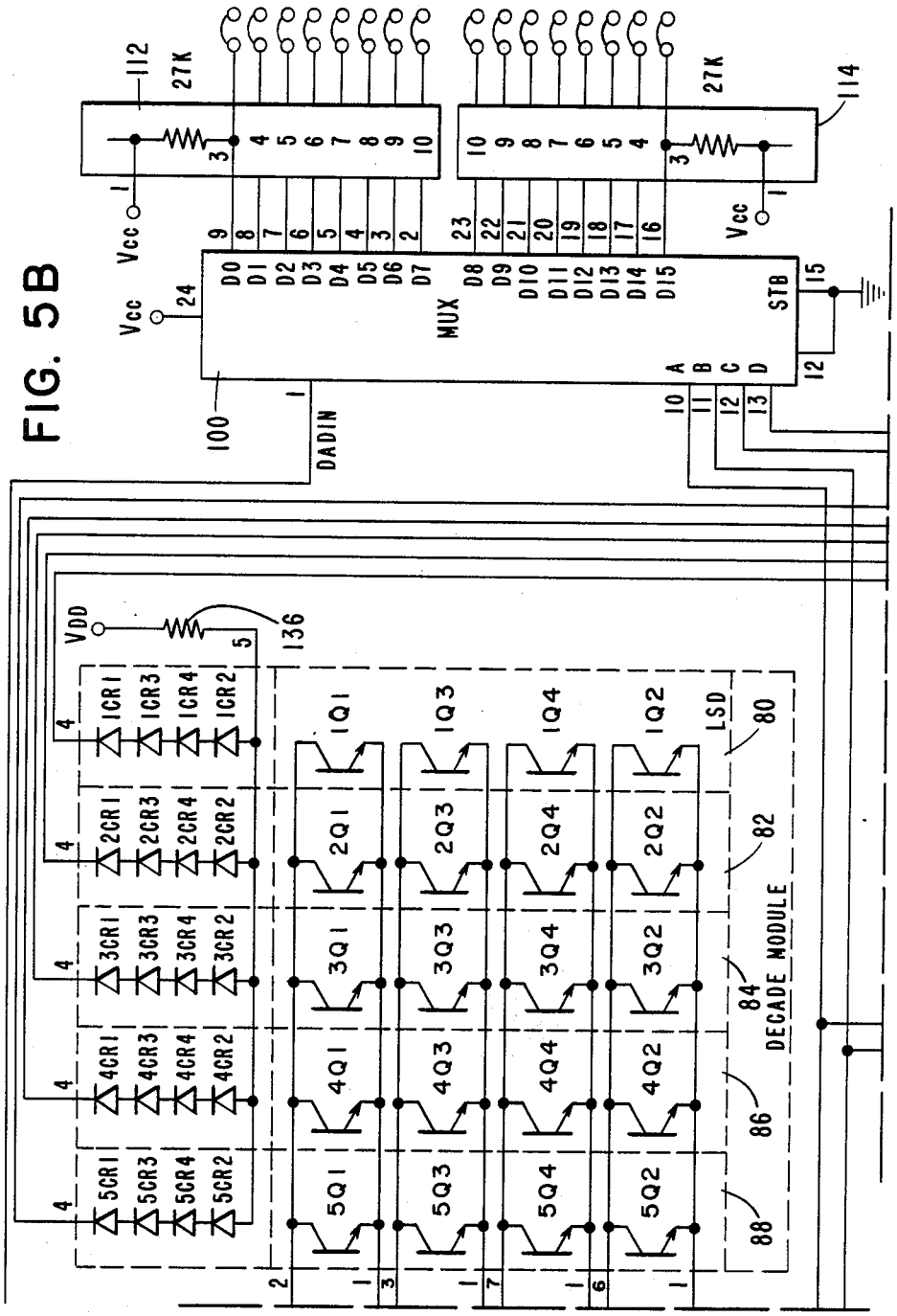
Figure 5C:
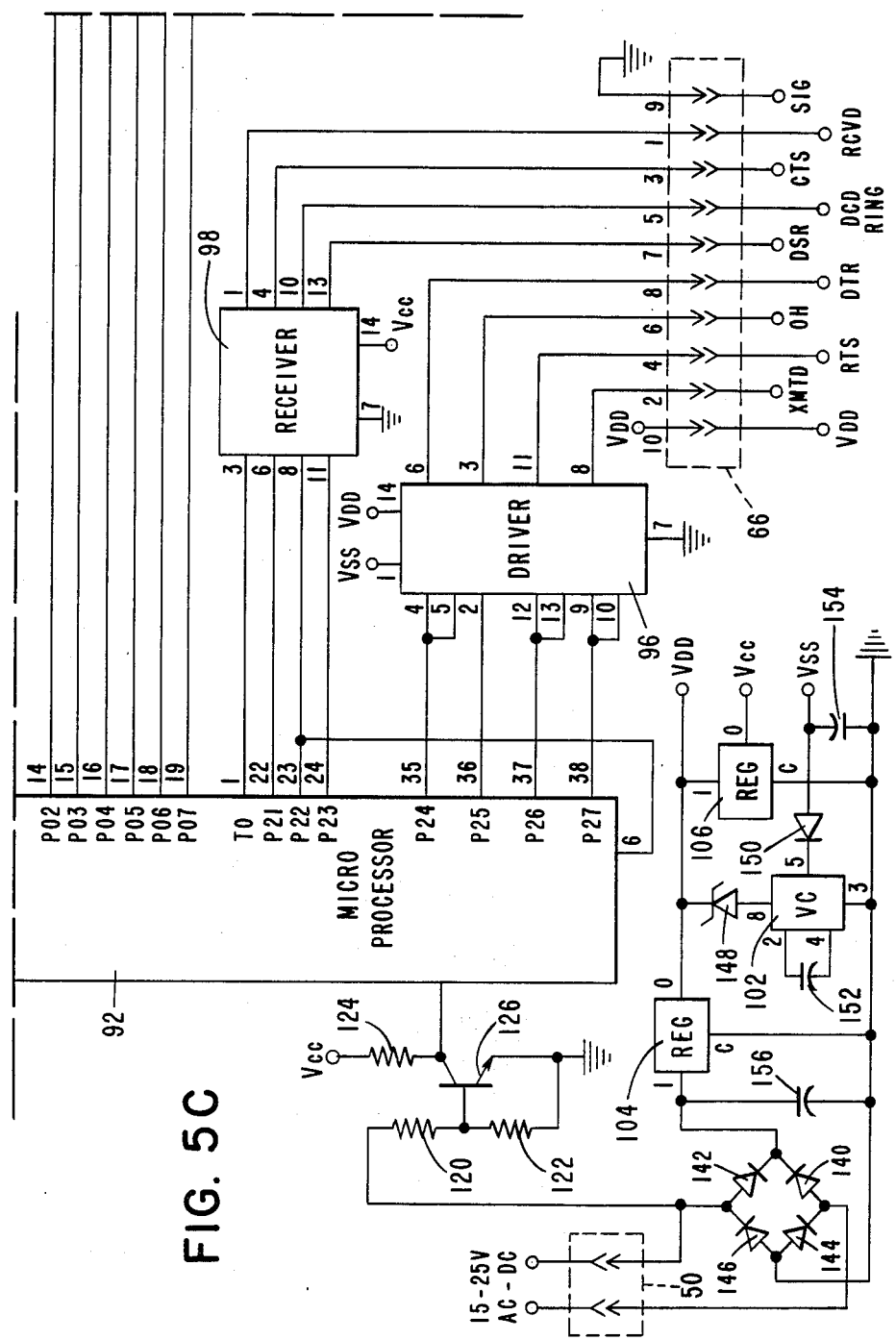

FIG. 4 shows generally the following devices operably associated with a central processing unit or erasable programmable microprocessor 92, such as Model No. 8749, manufactured by Intel Corporation, Santa Clara, Calif., and including a Quad 2:1 multiplexer 94, Part No. 74C157, manufactured by National Semiconductor Corporation, Santa Clara, Calif., a Quad line driver 96, made as No. MCL1488 by Motorola Inc., Schaumburg, Ill., a Quad line receiver 98, made as Motorola No. MCL1489, and a multiplexer 100, Part No. CD4067BE as manufactured by RCA Corporation, New York, N.Y. The multiplexer 94 (FIG. 5A) provides microcomputer I/O expansion for mode selects on the same lines as data input from the encoder modules 80–88 (FIG. 5B). The line driver 96 provides RS 232 output and handshaking output signals RTS, OH, and DTR (FIG. 5C). The line receiver 98 (FIG. 5C) accepts RS 232 data received and handshaking signals DSR, DCD, RING, and CTS. The DADIN line at multiplexer 100 is an input (high or low) to the microprocessor 92. A DC-DC voltage converter 102, Part No. ICL7660, Intersil, Inc., Cupertino, Calif., a pair of voltage regulators 104 and 106, Fairchild Industries, Inc., Germantown, Md., No. 7812 and No. 7805, respectively, and a transistor array 108, Sprague Electric Co., North Adams, Mass., No. ULN2803, complete the major components on the printed circuit board 22. The SEL O–SEL 4 lines at transistor array 108 (FIG. 5D) select the LED light sources and the decades of the module (FIG. 5B), the operation being that only one decade is selected at a time. In effect, the transistor array 108 drives the encoder light sources and the external loads (FIG. 5D). Further components on the printed circuit board 22 include a 27K SIP pull-up resistor 110, a resistor network having 27K portions 112 and 114, and a quartz crystal 116, FIG. 5A. A Schmitt trigger is made up of resistors 120, 122 and 124 (470K, 100K and 47K, respectively), FIG. 5C, along with a transistor 126. A 100 ohm resistor 128, FIG. 5A, is provided along with Schottky diodes 130, 132 and 134 in a circuit connecting an optional battery operated input. A small 100 ohm resistor 136, FIG. 5B, is provided in the supply circuit to the decade module for limiting the current flow in the diodes. A diode bridge is made up of 50 volt diodes 140, 142, 144 and 146, FIG. 5C, provided in the 16 VAC, 15–18 VDC input and the voltage regulating circuit which also includes a 3.9 volt Zener diode 148 and a blocking diode 150 in the voltage converter 102 circuit. The circuitry also includes a plurality of capacitors as at 152, 154 and 156 in the voltage regulating circuit, FIG. 5C, and a capacitor 158 in the reset for the microprocessor 92, FIG. 5A.

Figure 6:
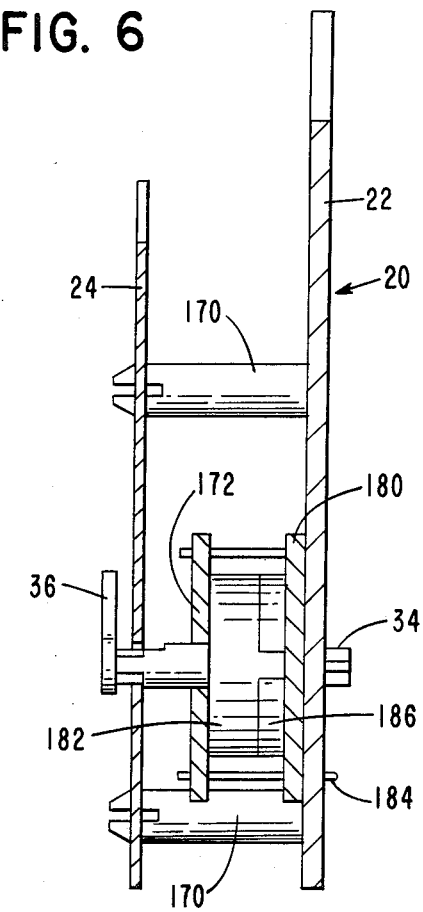
FIG. 6 is a side elevational view, partly in section, of the optical encoding device of FIG. 2.
Figure 8:
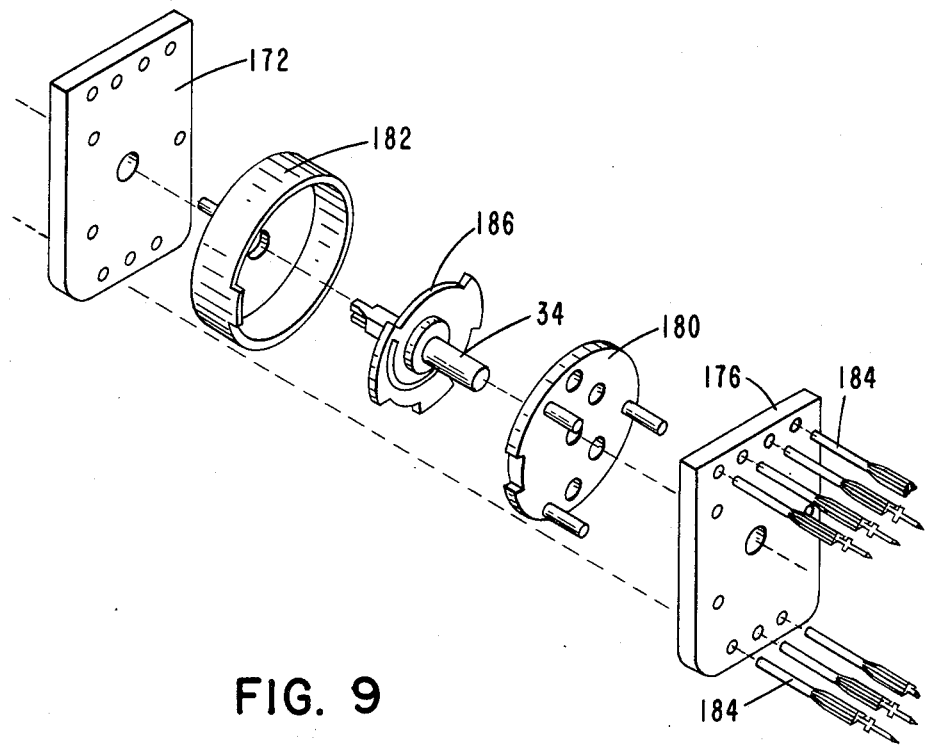
FIG. 8 is an enlarged exploded view of the optical encoder module.

FIG. 6 shows a side view, partly in section of the optical encoder 20, and illustrates the decade module assembly supported from the printed circuit board 22 and the face plate 24 secured to the board with plastic pins 170, and FIG. 8 shows an exploded view of parts of the module assembly. The decade module assembly includes the shaft 34, a printed circuit board 172 for carrying four infrared type, light emitting diodes, as 174, FIG. 9, a printed circuit board 176 for carrying four phototransistors, as 178, along with a mask 180 and a shroud 182. A plurality of posts 184 secure the two printed circuit boards 172 and 176 together and extend through the printed circuit board 22 for also securing the module assembly thereto. The shaft 34, FIG. 8, has a slotted wheel 186 secured thereto and rotatable in precise manner therewith. The light emitting diodes 174 may be type CLCLL2011 and the photosensitive transistors 178 may be type CLCT511, as manufactured by Clairex Corporation, Mount Vernon, N.Y.

Figure 7:
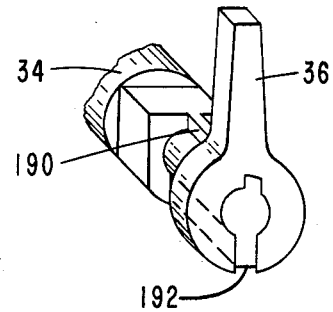
FIG. 7 is a perspective view of certain of the parts shown in FIG. 6.

FIG. 7 shows the dial pointer 36 positioned on the end of the shaft 34 which includes flat surfaces thereon between the pointer and the face plate 24 (FIG. 6) of the encoder unit 20 for accommodating the alignment tool 40 when installing the optical encoder on the meter 10. The end of the shaft 34 includes a pair of projections 190 and 192, the upper projection 190 being offset from center to allow the dial pointer 36 to be keyed to the shaft.

Figure 9:
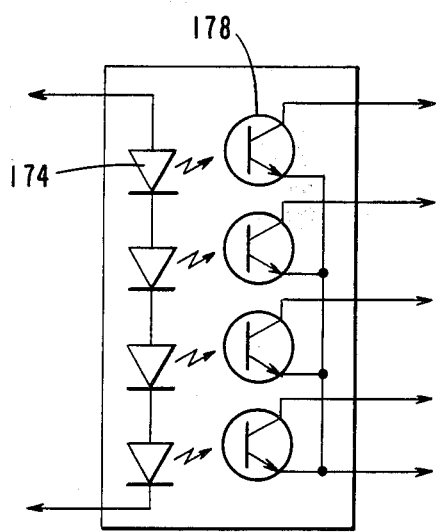
FIG. 9 is a wiring diagram of the light source and light sensing elements of the encoder module.

FIGS. 8 and 9 illustrate the optical encoder module which carries the radiation or other light sources 174 (see also FIG. 10) and the light sensors 178 (see also FIG. 10) along with the slotted wheel 186 which is instrumental in encoding the angular rotation of the wheel and of the meter register.

In the operation of the readout module assembly, such as 80, the four light emitting diodes 174 on the printed circuit board 172 illuminate the four photosensitive transistors 178 on the printed circuit board 176 if the light path is open, as determined by respective apertures in the shroud 182, slots in the wheel 186, and openings in the mask 180. When not illuminated, the transistors are off (non-conducting) and their outputs are high, and conversely, when illuminated the transistors are on (conducting) and their outputs are low.

The construction of the readout module 80 is such that sixteen logical states are generated by one rotation of the wheel 186 in an arrangement wherein one and only one of the four transistors 178 switches at any change in state. The angular rotation between switching positions is nominally 22.5 degrees but all switch positions at which turn off occurs lead the nominal position by five degrees. The outputs of the transistors 178 indicate the position of the wheel 186 and of the watt hour meter pointer 36 to the accuracy of one-sixteenth of a revolution plus or minus one position.

Figure 10:
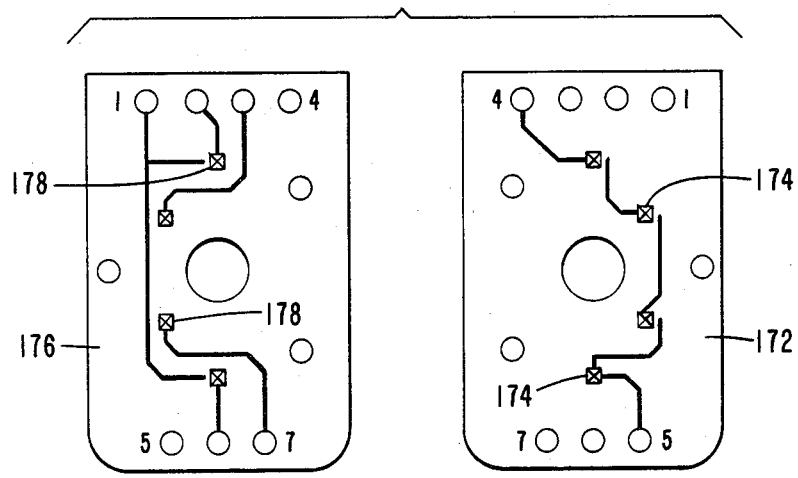
FIG. 10, on the sheet with FIG. 1, shows the locations of the diodes and of the transistors on their respective circuit boards.

The four light emitting diodes 174 on the printed circuit board 172 are connected in series, as shown in FIG. 10. To read out the position of the wheel 186, +12 volts DC is supplied through an external 100 ohm resistor to pin 5 causing current to flow and return through pin 4 to 0 volts DC. The outputs of the four transistors 178 then indicate to an external device the position of the wheel 186 in a four bit binary code. The emitters of the four transistors 178 are connected together and to pin 1 and the collector of each of the four transistors is connected to a respective output pin on the printed circuit board 176.

A few of the parameters associated with a preferred embodiment of the invention include an input power voltage of 16 volts AC or 15-18 volts DC, a serial I/O communications interface, type RS-232-C (connected through connector 66, FIG. 4), having a speed of 300/1200 baud, the three inputs of binary type for alarm detection and the three outputs of binary type for load control. The microprocessor 92 is Intel MOS 8-bit No. 8749 having a ROM of 2K bytes program storage and a RAM of 128 bytes data storage.

The software provided with the optical encoder 20 is constructed of a set of user friendly commands which direct the encoder to perform a series of tasks ranging from reading the physical meter register value to performing complex time-of-day calculations. Each encoder unit 20 is an intelligent terminal and responds, regardless of the communications media, to a set of ASCII characters wherein the key character that designates the particular command is the first character of the actual command word. The 12 software commands fall into two categories, namely immediate or type I commands, which direct the encoder unit 20 to perform an immediate function such as Read the meter position and transmit the reading, and functional or type II commands which supply the encoder unit with operating parameters or which cause the unit to perform any function that does not require a response.

The 12 software commands are listed in alphabetical order as follows:

Align—The Align command directs the microprocessor to update the internal time-of-day (TOD) clock to the last clock parameter received.

Clock—This command directs the microprocessor to enter a subroutine to capture the next four data characters and store those characters in a holding register called the Intermediate Clock Register (ICR). This register is used in other functions as a means of passing a time parameter.

Dump—The Dump command directs the encoder unit to transmit all of its internally stored values. These include peak demand calculations and accumulated totals for all four time-of-use periods.

Erase—The Erase command is used to clear all calculated and stored values as a result of demand metering cycles and time-of-use period functions, which functions are also disabled.

Interval—When this command is detected, the encoder unit establishes an interval time (between 1 and 59 minutes) from the Intermediate Clock Register. This value is used as the sampling period over which peak demand data is gathered. The interval function is then initiated and will remain in the sampling condition until terminated.

Julian—The encoder unit maintains the day of the year and the Julian command updates the internal Julian Date Register (JDR) with the value last received in the most recent clock command.

Load—The Load function directs the microprocessor to capture the next character (an ASCII number from 0 to 7) and set the load control outputs to that binary value. Loads are controlled in a bit combinatorial basis to allow for simultaneous switching of devices on or off.

Period—The encoder unit can maintain up to four time-of-use periods (between 1 minute and 24 hours). A starting and ending time is passed with the clock command and directed to the appropriate period starting and ending times with the Period command.

Query—The Query command directs the microcomputer to respond to the calling equipment with the status of the alarms, load control outputs, internal microprocessor status, and the current time of day.

Read—This command is issued to the encoder unit each time the calling equipment desires the instantaneous meter reading. The R command directs the encoder unit to scan all associated decades, perform the required ambiguity correction, and respond with the present reading in the normal response sequence.

Store—The Store command directs the microcomputer to capture the present meter reading and to store the value in its internal RAM until requested.

Transmit—The value captured using the Store command may be accessed from the internal RAM with the Transmit command. This is a non-destructive read.

A general rule applying to those commands requiring a response to be sent to the calling equipment (type I or immediate commands) follows the same response format or sequence of an address indicator (A), followed by the device address (1234), the data (variable), and the termination sequence (CRLF).

Figure 11:
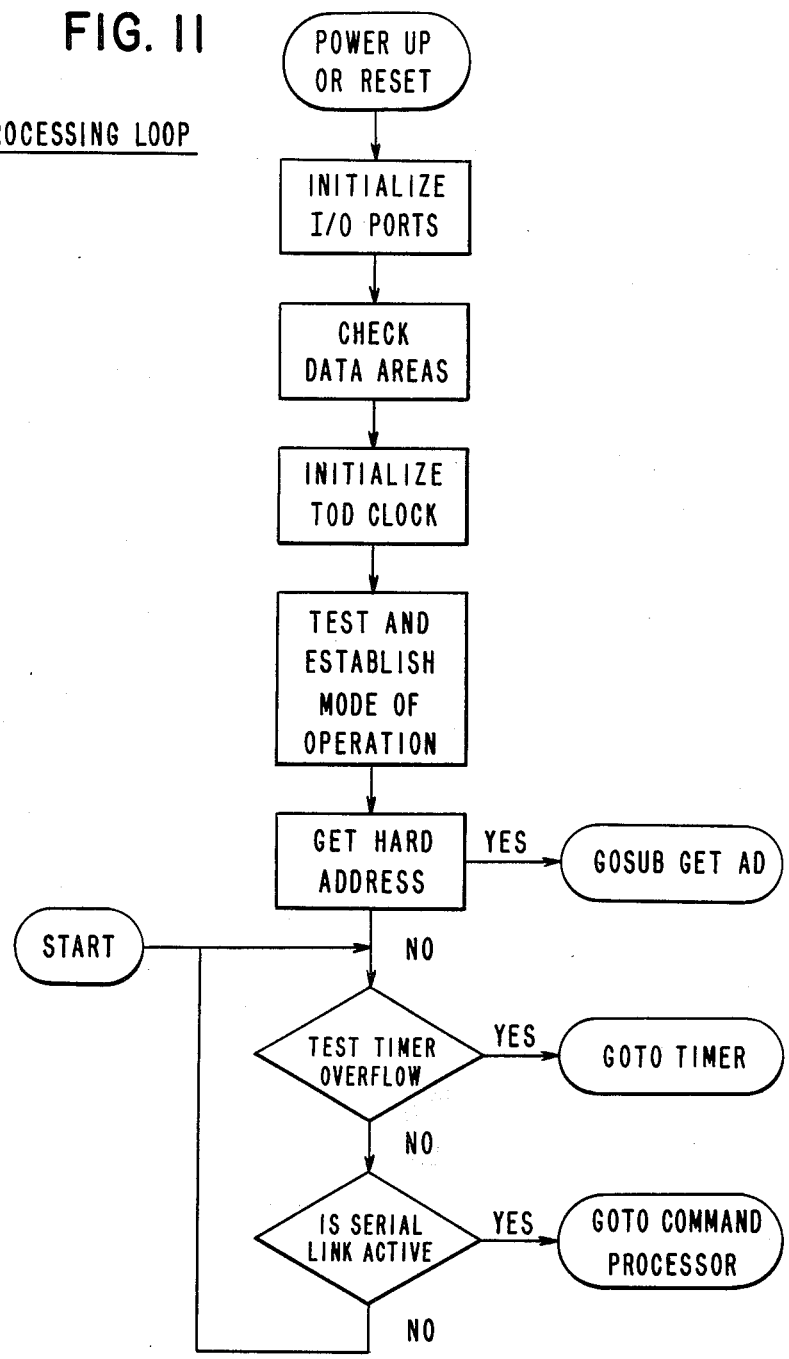
FIG. 11 forms a flow diagram of the main processing loop showing the operation of the system.
Figure 12B:
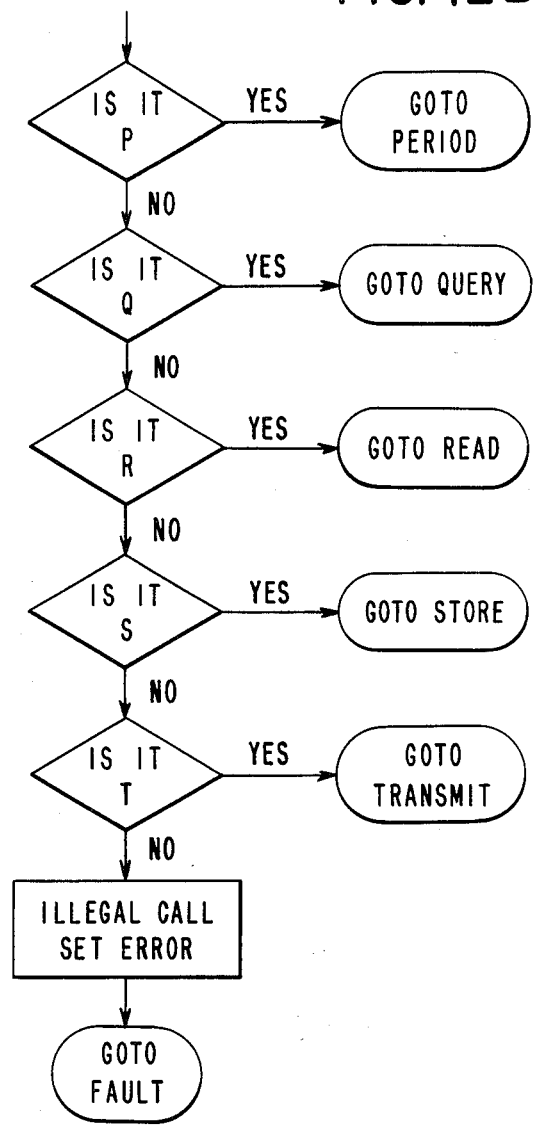
Figure 13A:
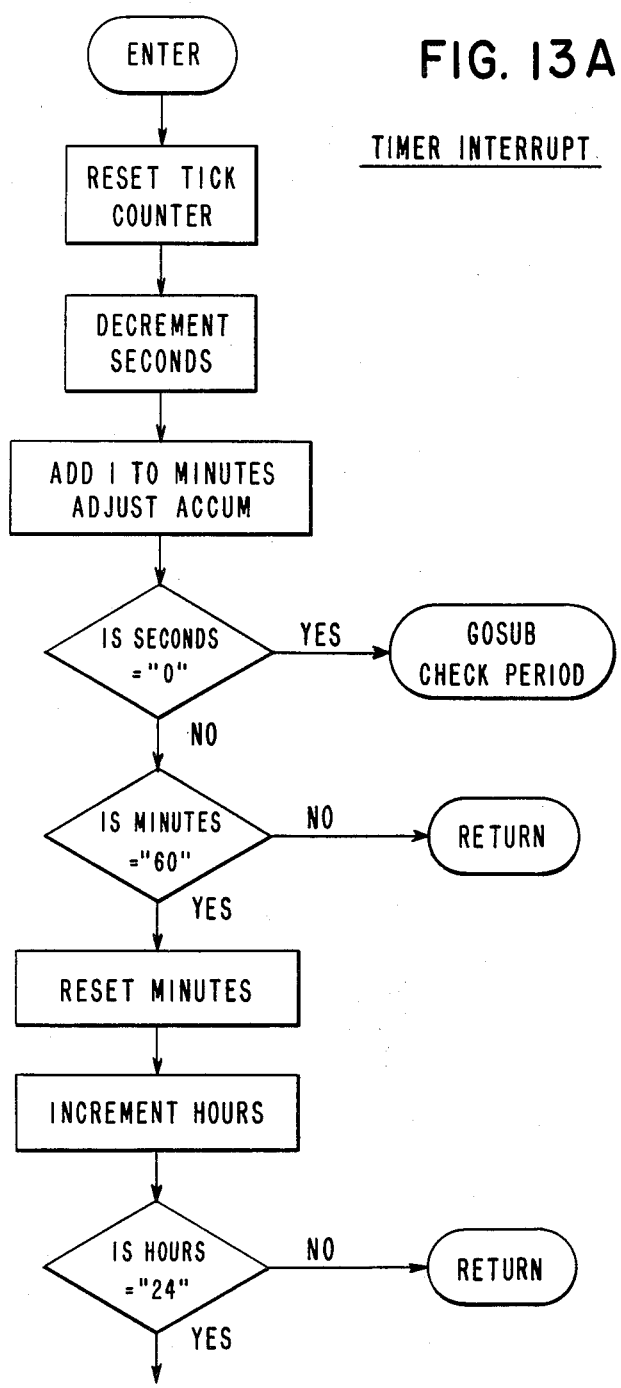
FIGS. 13A and 13B taken together form a flow chart of the timer interrupt operation.
Figure 13B:
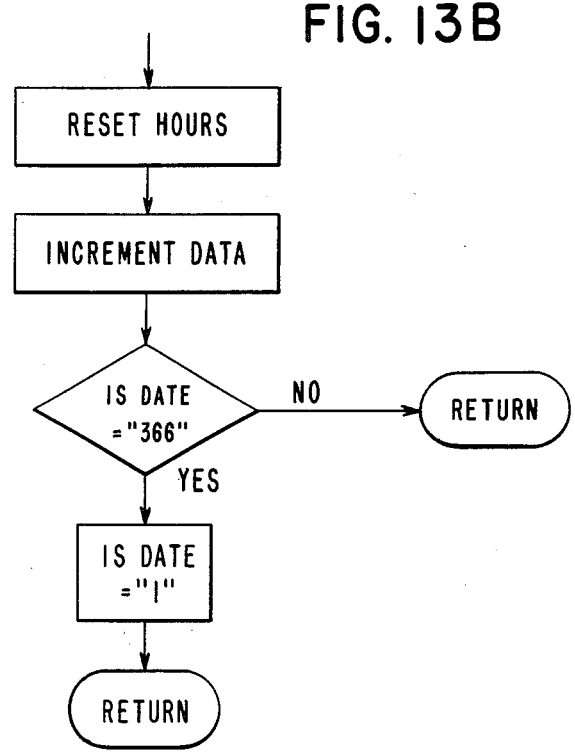
Figure 14:
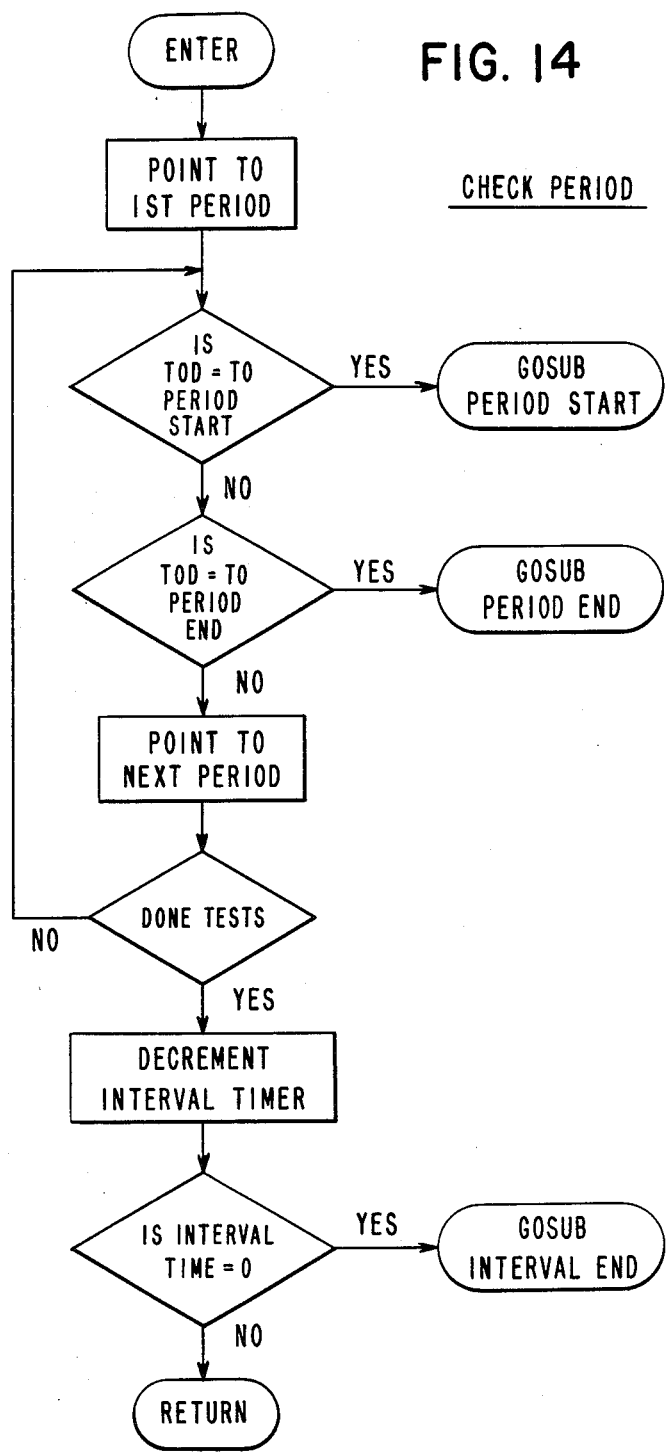
FIG. 14 illustrates steps of the check period.
Figure 15A:
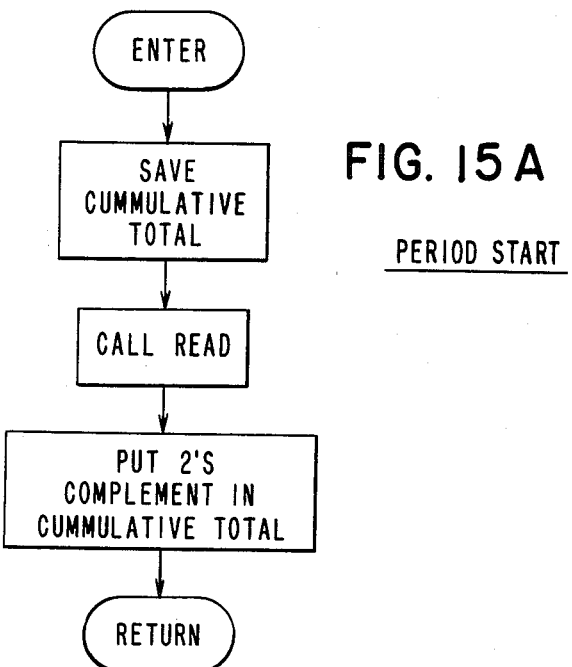
FIGS. 15A and 15B show the period start and period end operations.
Figure 15B:
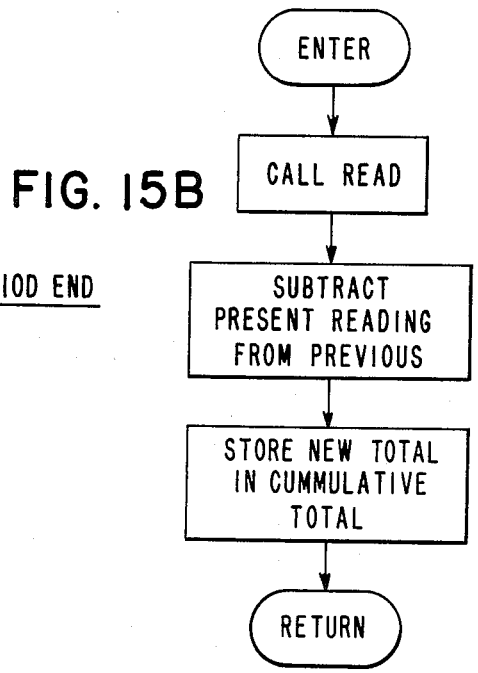
Figure 17A:
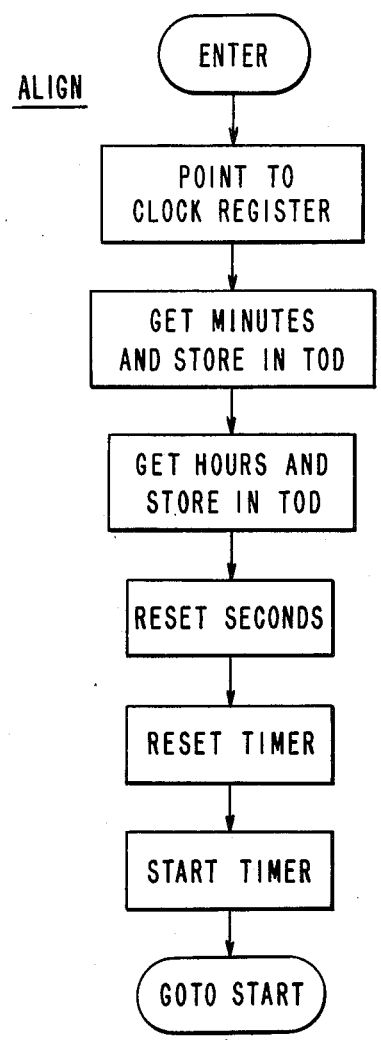
FIGS. 17A–17L, inclusive and taken together, form flow diagrams of the programmable commands utilized in the system.
Figure 17B:
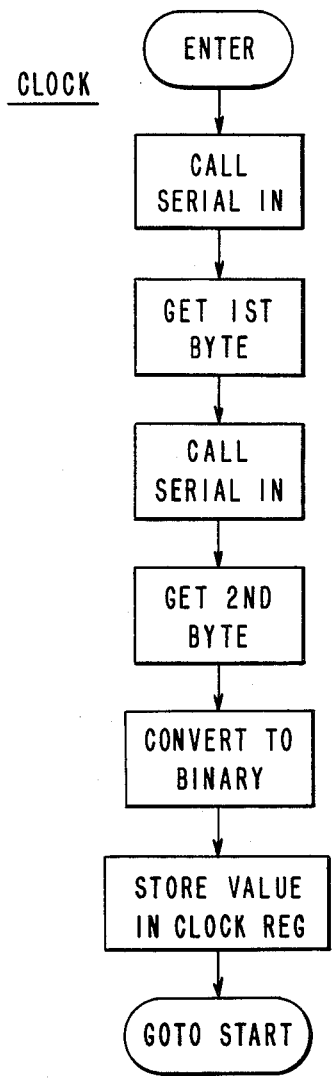
Figure 17C:
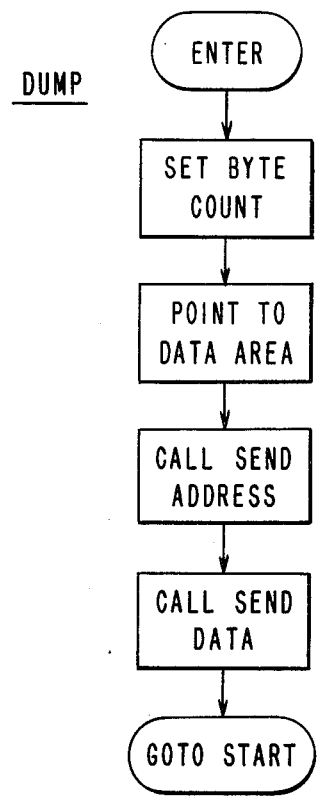
Figure 17D:
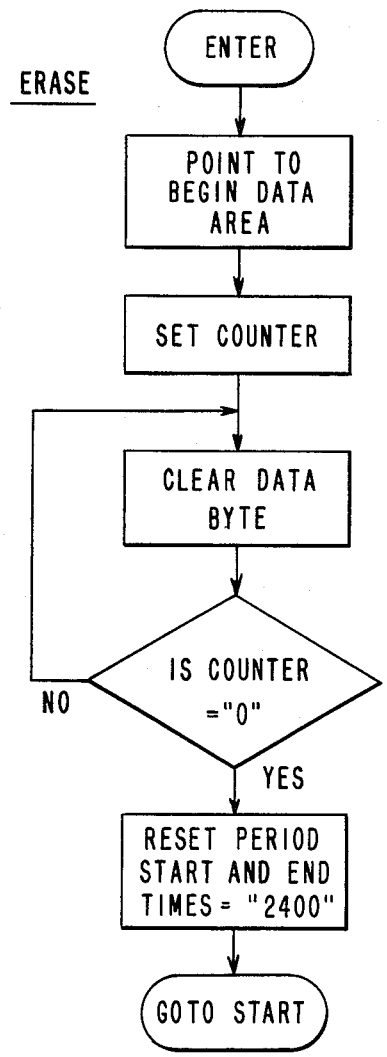
Figure 17E:
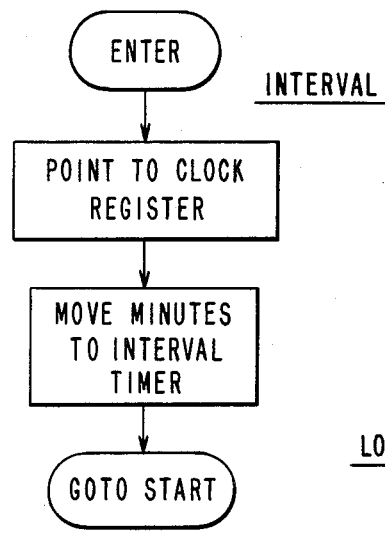
Figure 17F:
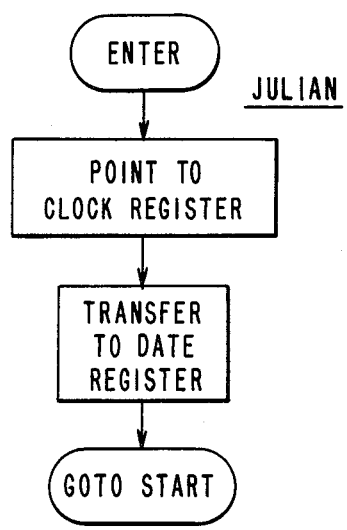
Figure 17G:
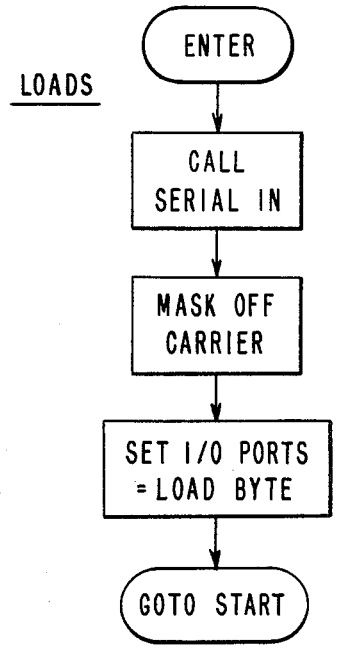
Figure 17H:
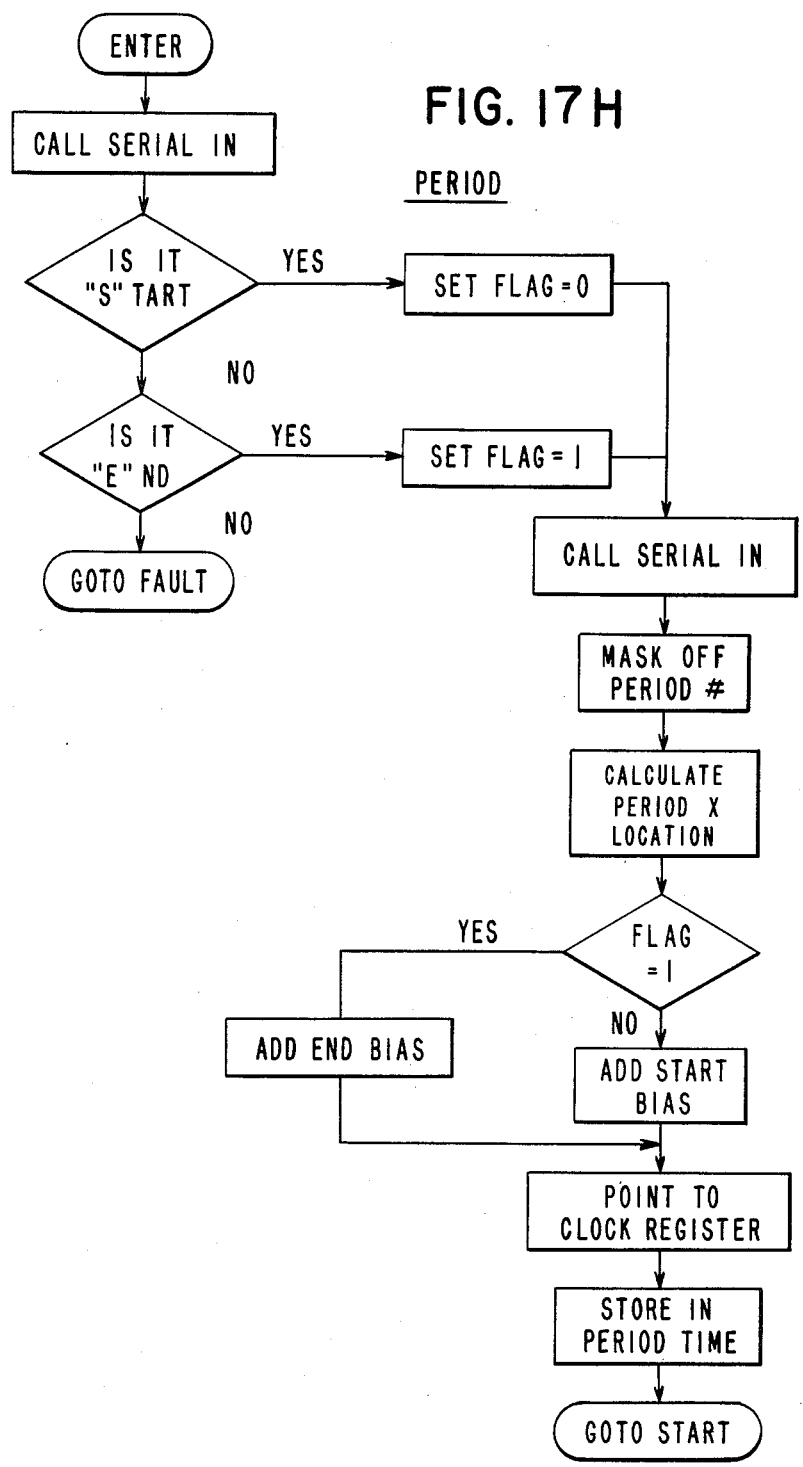
Figure 17I:
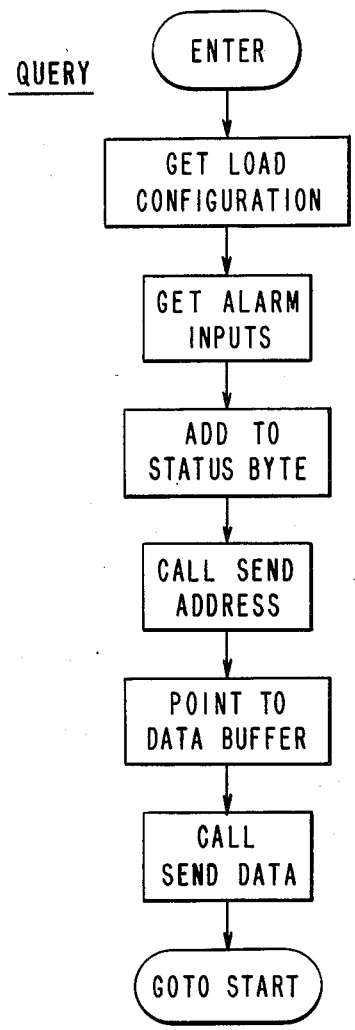
Figure 17J:
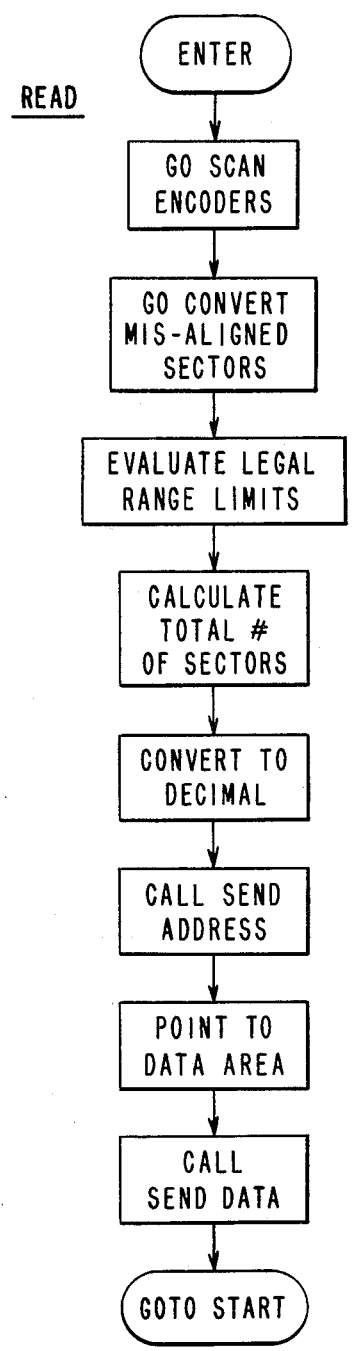
Figure 17K:
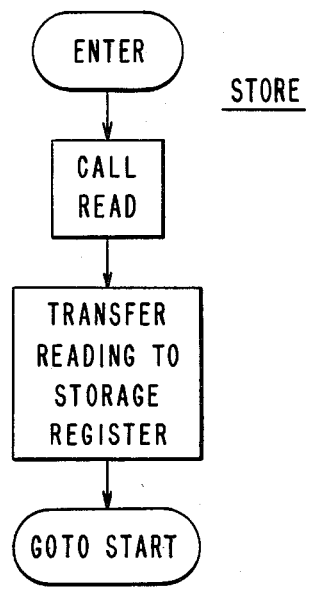
Figure 17L:
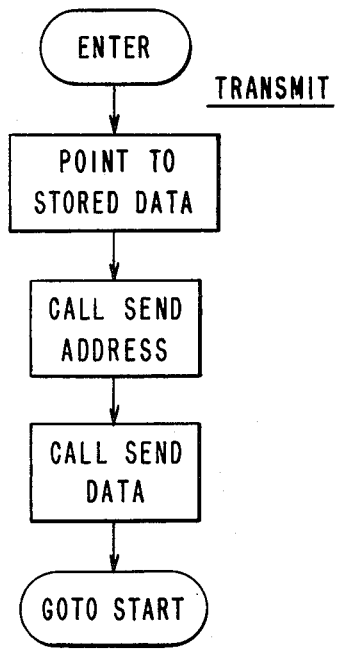
Figure 20:
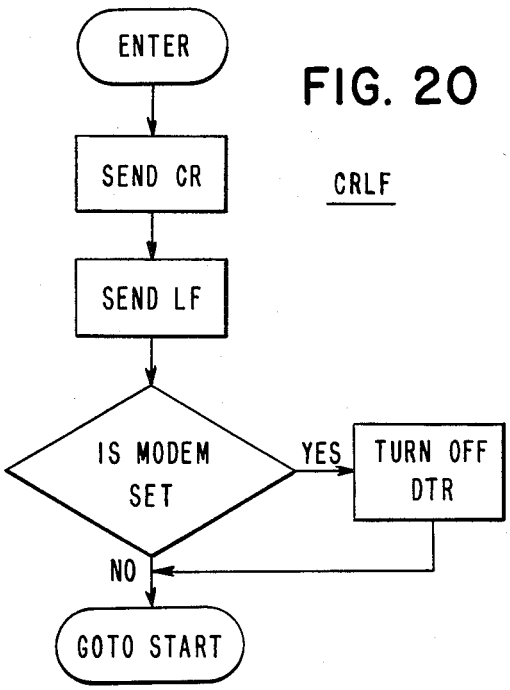
FIG. 20, on the sheet with FIGS. 17K and 17L, is a flow chart of the carriage return line feed operation.
Figure 18A:
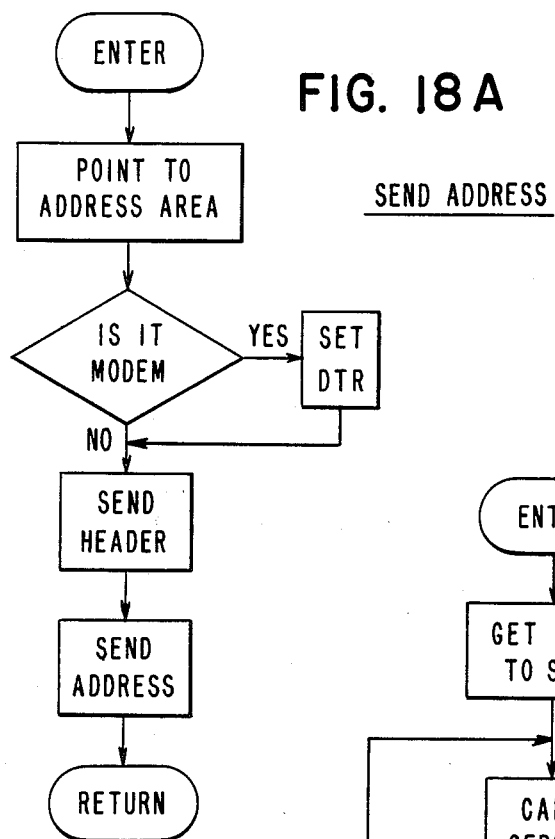
FIGS. 18A and 18B illustrate the steps in send address and send data operations.
Figure 18B:
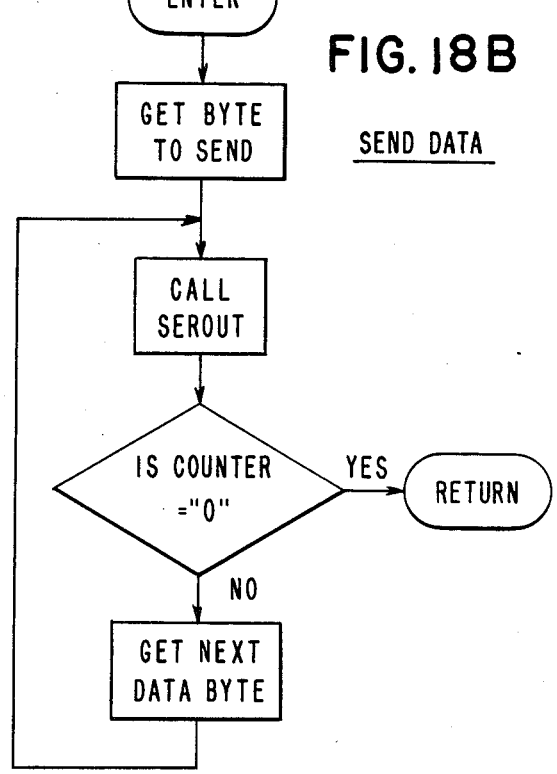
Figure 19B:
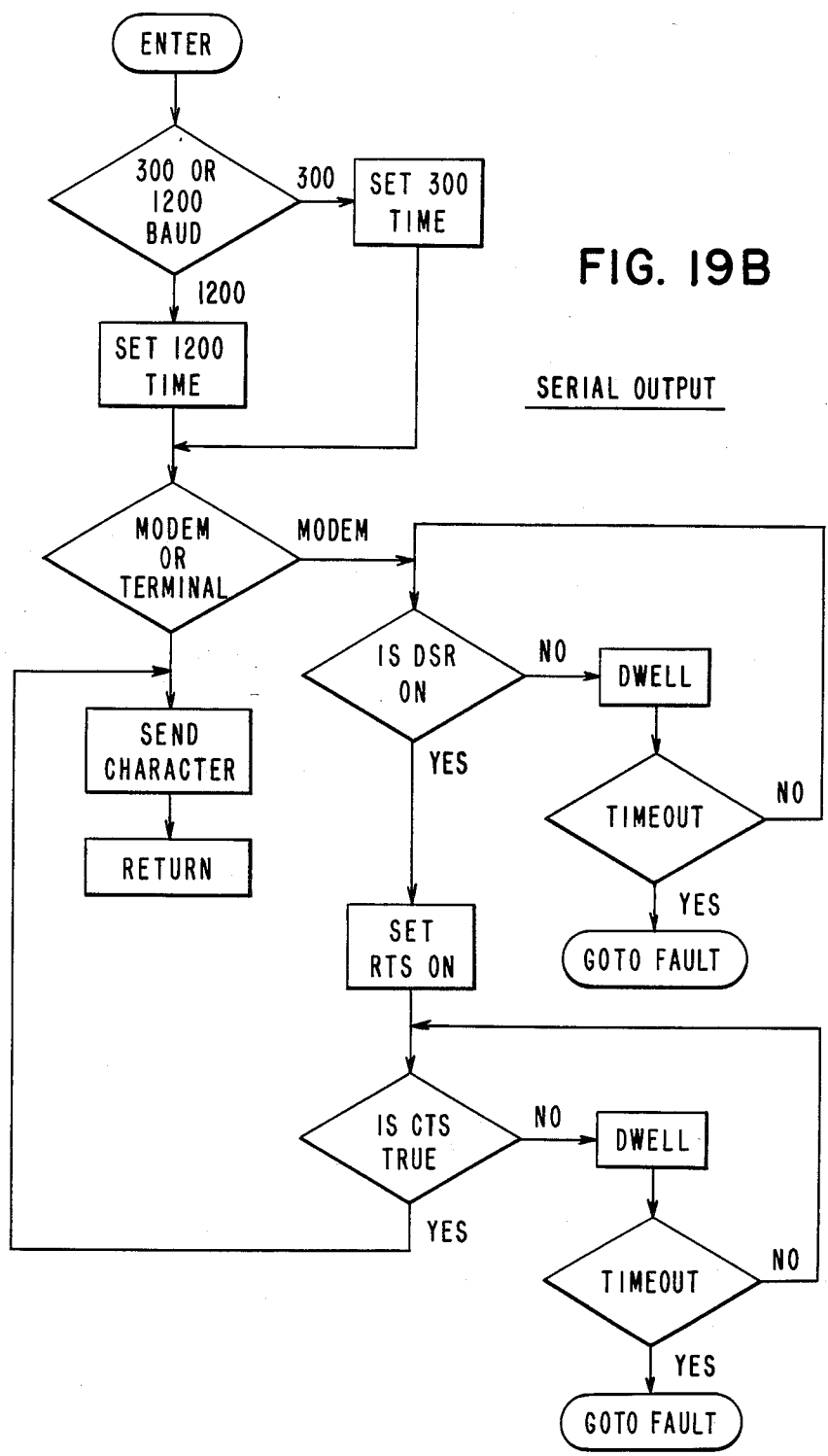

The flow charts provided herewith illustrate the steps in the main processing loop (FIG. 11), the steps of the command processor (FIGS. 12A and 12B), the timer interrupt (FIG. 13), the period check (FIG. 14) with period start (FIG. 15A) and period end (FIG. 15B), and the interval end (FIG. 16). The flow charts also illustrate the steps of the various software commands (FIGS. 17A-17L) and the serial input (FIG. 19A) and serial output (FIG. 19B). The send address (FIG. 18A) steps and send data (FIG. 18B) steps are illustrated in flow diagram form, along with FIG. 20 showing the steps of the carriage return line feed operation.

It is thus seen that herein shown and described is an optical encoding system that is installed in retrofit manner with an existing utility meter for performing a series of tasks that are remotely operated and controlled. The present invention enables the accomplishments and the advantages mentioned above and, while a preferred embodiment of the invention has been disclosed herein, variations thereof may occur to those skilled in the art. It is contemplated that all such variations and modifications not departing from the spirit and scope of the invention hereof are to be construed in accordance with the following claims.

We claim:

1. Encoding apparatus secured to and for use with a utility meter having at least one dial register carried on a shaft and arranged to be responsive to registering of energy consumption, said apparatus comprising
   clock means,
   at least one modular assmebly having at least one dial register axially corresponding and operably coupled to the dial register of the utility meter and having a slotted wheel for movement with the dial register of the modular assembly,
   radiation source means and means for sensing the radiation source means,
   means operably associated with the modular assembly for interrupting beams of radiation from said radiation source means,
   means responsive to detection by the radiation sensing means of interruption of the beams of radiation for outputting signals, and
   programmable means including a serial communications link enabling at least one of a plurality of metering functions to be performed at times set by said clock means for converting the output signals into code form for transmission thereof to a facility remote from the utility meter.

2. The encoding apparatus of claim 1 including a plurality of modular assemblies wherein each slotted wheel is carried on a respective shaft and positioned in a plane for interrupting the beams of radiation between the radiation source means and the sensing means and each of said wheels has a plurality of slots extending in circular manner at a plurality of locations therein for providing output signals representing the angular position of each of said encoding wheels.

3. The encoding apparatus of claim 1 wherein the programmable means includes a microprocessor responsive to a plurality of command words taking the form of ASCII characters wherein the key character that designates the particular command is the first character of each command word.

4. The encoding apparatus of claim 3 wherein the microprocessor is programmable to provide demand meter readings of the utility meter dial register at peak demand for intervals at times set by said clock means.

5. The encoding apparatus of claim 3 wherein the microprocessor is programmable to provide time-of-day meter readings of the utility meter dial register for one or more periods at times set by said clock means.

6. The encoding apparatus of claim 3 including means for selecting the radiation source means of each modular assembly in timed sequential manner and providing encoded output signals to a transmitting line for remote reading of the meter.

7. An optical encoder for fitting on the face of and secured to a utility meter having a plurality of dial registers carried on respective shafts and angularly displaceable in a denominational manner and operable for recording the consumption of energy, said encoder comprising
   clock means, a
   printed circuit board carrying a microprocessor and integrated circuits operable therewith, a
   plurality of module assemblies having light source means and light sensor means, and rotational means comprising a plurality of dial registers axially aligned and operably associated with the utility meter dial registers, said module assemblies including slotted and apertured rotational members connected with the dial registers of the rotational means for interrupting beams of light from the light source means,
   means responsive to the detection by the sensor means of interruption of the beams of light for translating the readings of the registers into digitally encoded signals, and
   programmable means including a serial communications line enabling a plurality of metering functions to be performed as timed by said clock means and for addressing one of a plurality of commands directed to said microprocessor for transmission of the encoded signals to a remote facility.

8. The optical encoder of claim 7 wherein the slotted rotational member of each of said module assemblies includes an encoding wheel carred on a respective shaft directly connected with an associated dial register and each of said wheels has a plurality of slots in circular manner on the periphery thereof for providing output signals representing the angular position of each of said encoding wheels.

9. The optical encoder of claim 7 wherein the microprocessor includes memory circuits and signal generation circuits to provide demand meter readings of the meter registers.

10. The optical encoder of claim 7 wherein the microprocessor is responsive to a plurality of command words in the form of ASCII characters wherein the key character that designates the particular command is the first character of each command word.

11. The optical encoder of claim 7 wherein the microprocessor is programmable to provide demand meter readings of the dial registers thereof for intervals as timed by said clock means.

12. The optical encoder of claim 7 wherein the microprocessor is programmable to provide time-of-day meter readings of the meter dial registers for periods as timed by said clock means.

13. An optical encoder adapted to be retrofit on and secured to a utility meter having a plurality of dial registers carried on respective shafts and angularly movable in a denominational manner and responsive to measure consumption of energy, said optical encoder comprising an interval clock, a printed circuit board carrying a microcomputer and integrated circuit devices operable therewith, a plurality of readout modules having a plurality of dial registers carried on respective shafts and axially aligned in keyed manner and operably coupled to respective dial registers of the utility meter and having light source means and light sensing means in spaced relationship, each of said readout modules including a wheel defining circular oriented slots therein permitting passage of light from said light source means to said light sensing means and including mask means defining apertures therein positioned to interrupt beams of light from the light source means, the rotation of the wheel and mask means providing sequential transmission and interruption of the beams of light, means responsive to the transmission and interruption of the gemas of light for outputting signals indicating rotational movement of the readout module dial registers and of the wheel and the mask means, and means including a serial communications link enabling a plurality of metering functions to be performed as timed by said internal clock and responsive to command signals directed to said microcomputer for converting the output signals into binary code for transmission thereof to a remote facility.

14. The optical encoder of claim 13 wherein each of said readout modules includes a first printed circuit board containing a plurality of light emitting diodes in predetermined positions and a second printed circuit board containing a plurality of phototransistors arranged in corresponding positions and spaced from said diodes, said first and second printed circuit boards being secured to the microcomputer-carrying printed circuit board.

15. The optical encoder of claim 13 wherein the microcomputer is responsive to a plurality of command words in the form of ASCII characters wherein the key character that designates the particular command is the first character of each command word.

16. The optical encoder of claim 13 wherein the communications link for transmitting output signals in serial manner is driven in eight-bit word asynchronous manner.

17. The optical encoder of claim 13 wherein the printed circuit board includes a plurality of mode of operation selection means operable with the serial communications link for receiving and transmitting data in accordance with the selected mode of operation.

18. The optical encoder of claim 17 wherein the modes of operation include a time-of-day mode and a demand mode.

19. The optical encoder of claim 13 wherein the printed circuit board includes a transistor array for selecting and driving the light source means and for selecting the read out module for operation one at a time.

20. The optical encoder of claim 13 wherein each of said readout modules includes a first printed circuit board containing a plurality of infrared type, light emitting diodes in predetermined positions, a shroud adjacent the first printed circuit board, each of the respective shafts of the readout module having an encoding wheel secured thereto and having said slots positioned for passage of emitted light, a mask plate carried on the module shaft and defining apertures therein position for interrupting emitted light upon rotation of the module shaft as rotated by the corresponding meter register shaft, and a second printed circuit board containing a plurality of phototransistors arranged in positions corresponding to said diodes for sensing emitted light therefrom.

21. The optical encoder of claim 13 wherein the printed circuit board includes multiplexer for providing microcomputer input/output expansion for selection of operational modes, a driver for providing serial data transmission and handshaking output signals, a receiver for accepting serial data and handshaking signals, a multiplexer providing high or low input to the microcomputer, and a transistor array for selecting and driving the light source means and for selecting the readout module to be operated at any one time.

* * * * *